(12) United States Patent
Crouch et al.

(10) Patent No.: US 12,036,511 B2
(45) Date of Patent: Jul. 16, 2024

(54) SYSTEMS AND METHODS FOR SUPPLYING LOW SALINITY INJECTION WATER

(71) Applicant: BP EXPLORATION OPERATING COMPANY LIMITED, Sunbury on Thames (GB)

(72) Inventors: John Henry Crouch, Bedfordshire (GB); John Dale Williams, Sunbury on Thames (GB)

(73) Assignee: BP Exploration Operating Company Limited (GB)

( * ) Notice: Subject to any disclaimer, the term of this patent is extended or adjusted under 35 U.S.C. 154(b) by 534 days.

(21) Appl. No.: 17/293,856

(22) PCT Filed: Nov. 13, 2019

(86) PCT No.: PCT/EP2019/081162
§ 371 (c)(1),
(2) Date: May 13, 2021

(87) PCT Pub. No.: WO2020/099479
PCT Pub. Date: May 22, 2020

(65) Prior Publication Data
US 2022/0008868 A1    Jan. 13, 2022

(30) Foreign Application Priority Data
Nov. 14, 2018  (GB) ...................... 1818601

(51) Int. Cl.
*B01D 61/58*    (2006.01)
*B01D 61/02*    (2006.01)
(Continued)

(52) U.S. Cl.
CPC ........... *B01D 61/58* (2013.01); *B01D 61/025* (2013.01); *B01D 61/029* (2022.08); *B01D 61/10* (2013.01);
(Continued)

(58) Field of Classification Search
CPC ........ B01D 61/10; B01D 61/14; B01D 61/18; B01D 63/02; B01D 61/22; C02F 1/44; C02F 9/00; E21B 43/40
See application file for complete search history.

(56) References Cited

U.S. PATENT DOCUMENTS

2013/0213892 A1\* 8/2013 Henthorne ........... B01D 61/027
210/96.2
2014/0048462 A1    2/2014 Cohen et al.
(Continued)

FOREIGN PATENT DOCUMENTS

WO       2018/015223  A1    1/2018
WO    WO-2018015223  A1 \*  1/2018   ............. B01D 61/14
WO       2018/076115  A1    5/2018

OTHER PUBLICATIONS

International Search Report and Written Opinion dated May 29, 2020, for Application No. PCT/EP2019/081162.

*Primary Examiner* — Walter D. Griffin
*Assistant Examiner* — Cameron J Allen
(74) *Attorney, Agent, or Firm* — Conley Rose, P.C.

(57) ABSTRACT

A desalination system includes a desalination platform, a first skid disposed on a first deck of the desalination platform, the first skid including at least one of a first filtration unit configured to produce a first filtrate stream, and a first permeate unit configured to produce a first permeate stream, a first interconnecting pipework coupled to the first skid, and a first pipework support disposed on the first deck, wherein the first interconnecting pipework is disposed on the first pipework support.

20 Claims, 22 Drawing Sheets

(51) Int. Cl.
  *B01D 61/10* (2006.01)
  *B01D 61/14* (2006.01)
  *B01D 61/18* (2006.01)
  *C02F 1/44* (2023.01)
  *E21B 43/40* (2006.01)
  *C02F 103/08* (2006.01)

(52) U.S. Cl.
  CPC ......... *B01D 61/145* (2013.01); *B01D 61/149* (2022.08); *B01D 61/18* (2013.01); *C02F 1/441* (2013.01); *C02F 1/444* (2013.01); *E21B 43/40* (2013.01); *B01D 2221/04* (2013.01); *B01D 2311/26* (2013.01); *B01D 2313/54* (2013.01); *B01D 2317/025* (2013.01); *B01D 2317/04* (2013.01); *B01D 2317/08* (2013.01); *C02F 2103/08* (2013.01); *C02F 2201/001* (2013.01); *C02F 2201/007* (2013.01)

(56) References Cited

U.S. PATENT DOCUMENTS

| | | |
|---|---|---|
| 2015/0260028 A1 | 9/2015 | Kommepalli et al. |
| 2017/0349455 A1 | 12/2017 | Katz |

* cited by examiner

SYSTEMS AND METHODS FOR SUPPLYING LOW SALINITY INJECTION WATER

The present application is a 35 U.S.C. § 371 national stage application of PCT/EP2019/081162 filed Nov. 13, 2019, and entitled "Systems and Methods for Supplying Low Salinity Injection Water" which claims priority to GB patent application No. 1818601.5 filed Nov. 14, 2018, and entitled "Systems and Methods for Supplying Low Salinity Injection Water," both of which are hereby incorporated herein by reference in their entirety.

STATEMENT REGARDING FEDERALLY SPONSORED RESEARCH OR DEVELOPMENT

Not applicable.

BACKGROUND

Field of the Disclosure

The present disclosure generally relates to controlling the salinity of a low salinity injection water during a low salinity waterflood of a hydrocarbon bearing subterranean reservoir. A variable amount of produced water (and/or a variable quality produced water) can be disposed of as a blending stream for a blended low salinity injection water. The present disclosure also relates to minimizing the weight and/or lowering a center of mass of a desalination plant of an integrated system for providing ion specific low salinity injection water.

Background

A problem associated with low salinity water-flooding is that desalination techniques may yield water having a lower than optimal salinity for continuous injection into an oil bearing reservoir. Indeed, the desalinated water may be damaging to the oil-bearing rock formation of the reservoir and may inhibit oil recovery, for example, by causing swelling of clays in the formation. Thus, there is an optimal salinity for the injection water that provides the benefit of enhanced oil recovery and an ionic ratio which mitigates the risk of formation damage, and the optimum values may vary from formation to formation. Typically, where an oil-bearing formation comprises rock that contains high levels of swelling clays, formation damage may be avoided, while still releasing oil from the formation, when: (1) the injection water has a total dissolved solids content (TDS) in the range of 200 to 10,000 ppm, and (2) the ratio of the concentration of multivalent cations in the low salinity injection water to the concentration of multivalent cations in the connate water of the reservoir is less than 1, for example, less than 0.9.

Additionally, low salinity water-floods generally need to meet reservoir specific sulfate criteria, in that the sulfate level of the low salinity injection water should typically be controlled to a value of less than 100 mg/L (preferably, less than 40 mg/L, and more preferably, less than 25 mg/L) in order to mitigate the risk of souring or scaling of the reservoir. Souring arises through the proliferation of sulfate-reducing bacteria that use sulfate in their metabolic pathway, thereby generating hydrogen sulfide. Scaling arises from deposition of mineral scale upon mixing of a sulfate containing injection water with a connate water containing precipitate precursor cations such as barium cations.

Yet a further problem arises offshore in that there is a need to dispose of increasing amounts of produced water during a low salinity waterflood. It is generally prohibited to dispose of produced water into a body of water (e.g., the ocean). It may therefore be necessary and beneficial to dispose of the produced water (PW) by blending with a low salinity injection water. Moreover, reinjection of the blended PW may also reduce the required capacity of the desalination plant necessary for reservoir pressure management. The quantity and quality of the PW that is required to be blended with the low salinity injection water may vary over the life of the low salinity waterflood.

BRIEF SUMMARY OF THE DISCLOSURE

An embodiment of a desalination system comprises a desalination platform, a first skid disposed on a first deck of the desalination platform, the first skid comprising at least one of a first filtration unit configured to produce a first filtrate stream, and a first permeate unit configured to produce a first permeate stream, a first interconnecting pipework coupled to the first skid, and a first pipework support disposed on the first deck, wherein the first interconnecting pipework is disposed on the first pipework support. In some embodiments, the first skid comprises a membrane skid and the first permeate unit comprises a reverse osmosis (RO) membrane separation unit, and the first permeate stream comprises a RO permeate stream. In some embodiments, the first skid comprises an ultrafiltration (UF) skid and the first filtration unit comprises an UF filtration unit, and the first filtration stream comprises an UF filtrate stream. In certain embodiments, the interconnecting pipework is configured to receive at least one of the first filtrate stream and the first permeate stream from the first skid, and to provide an inlet feed stream to the first skid. In certain embodiments, the first skid comprises a support structure comprising an upper frame positioned at a top of the first skid and a lower frame positioned at a base of the first skid, an inlet pipework coupled between an inlet valve and a first filtration unit supported by the support structure, wherein the first filtration unit is configured to produce a first filtrate stream from an inlet stream supplied to the inlet valve, and a discharge pipework coupled between the first filtration unit and a discharge valve, and wherein the inlet valve and the discharge valve are each directly supported by the lower frame of the support structure. In some embodiments, the desalination system further comprises an inlet header extending vertically between the upper frame and the lower frame of the support structure, a plurality of the first filtration units, wherein each of the plurality of first filtration units is in fluid communication with the inlet header, wherein the inlet pipework is coupled between the inlet valve and the inlet header, wherein the inlet header is directly supported by the lower frame of the support structure. In some embodiments, the interconnecting pipework is coupled between the first skid and a second skid, wherein the second skid is disposed on a second deck of the desalination platform, and wherein the second skid comprises a first membrane separation unit configured to produce a first permeate stream.

An embodiment of an integrated system comprises a desalination system, comprising a desalination platform, a first skid disposed on a first deck of the desalination platform, the first skid comprising a first filtration unit configured to produce a first filtrate stream, a second skid disposed on the desalination platform, the second skid comprising a first membrane separation unit configured to receive the first filtrate stream from the first skid and produce a first permeate stream, a first interconnecting pipework coupled between the first skid and the second skid, and a first pipework support disposed on the first deck, wherein the first interconnecting pipework is disposed on the first pipework support, an injection system for one or more injection wells that penetrate an oil-bearing layer of a reservoir, a blending system, and a production system to separate fluids produced from one or more production wells that penetrate the oil-bearing layer of the reservoir and to deliver a produced water (PW) stream to the blending system, wherein the blending system is to blend the first permeate stream with the PW stream to produce a blended low salinity water stream for injection into the reservoir. In some embodiments, the integrated system further comprises a control system configured to control the blending of the first permeate stream with the PW stream. In some embodiments, the first skid comprises an ultrafiltration (UF) skid and the first filtration unit comprises an UF filtration unit, and the first filtrate stream comprises an UF filtrate stream. In certain embodiments, the second skid comprises a membrane skid and the first membrane separation unit comprises a reverse osmosis (RO) membrane separation unit, and the first permeate stream comprises a RO permeate stream. In certain embodiments, the second skid comprises a support structure comprising an upper frame positioned at a top of the first skid and a lower frame positioned at a base of the first skid, an inlet pipework coupled between an inlet valve and a first membrane separation unit supported by the support structure, wherein the first membrane separation unit is configured to produce the first permeate stream from an inlet stream supplied to the inlet valve, and a permeate pipework coupled between the first membrane separation unit and a permeate valve, and wherein the inlet valve and the permeate valve are each directly supported by the lower frame of the support structure. In certain embodiments, the inlet valve and the permeate valve are each positioned nearer to the lower frame than to the upper frame of the support structure. In some embodiments, the second skid further comprises a discharge pipework connected between the first membrane separation unit and a second membrane separation unit supported by the support structure, wherein the discharge pipework is configured to provide a discharge stream from the first membrane separation unit to the second membrane separation unit.

An embodiment of a skid for providing a permeate stream comprises a support structure comprising an upper frame positioned at a top of the skid, a lower frame positioned at a base of the skid, and a plurality of vertically extending members coupled between the upper frame and the lower frame, an inlet pipework coupled between an inlet valve and a first membrane separation unit supported by the support structure, wherein the first membrane separation unit is configured to produce a first permeate stream from an inlet stream supplied to the inlet valve, and a permeate pipework coupled between the first membrane separation unit and a permeate valve, and wherein the inlet valve and the permeate valve are each directly supported by the lower frame of the support structure. In some embodiments, the first membrane separation unit comprises a reverse osmosis (RO) membrane separation unit. In some embodiments, the skid further comprises an inlet header extending vertically between the upper frame and the lower frame of the support structure, a plurality of the first membrane separation units, wherein each of the plurality of first membrane separation units is in fluid communication with the inlet header, wherein the inlet pipework is coupled between the inlet valve and the inlet header, wherein the inlet header is directly supported by the lower frame of the support structure. In certain embodiments, the plurality of first membrane separation units are supported by a plurality of support racks spaced between the upper frame and the lower frame of the support structure. In certain embodiments, the skid further comprises a discharge header extending vertically between the upper frame and the lower frame of the support structure, wherein the discharge header is in fluid communication with the plurality of first membrane separation units, a permeate discharge pipework connected between the permeate discharge header and a plurality of second membrane separation units supported by the support structure, wherein the discharge pipework is configured to provide a discharge stream from the plurality of first membrane separation units to the plurality of second membrane separation units. In some embodiments, the inlet valve and the permeate valve are each positioned nearer to the lower frame than to the upper frame of the support structure.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of the disclosed embodiments of the invention, reference will now be made to the accompanying drawings in which.

DETAILED DESCRIPTION

Figure 1:
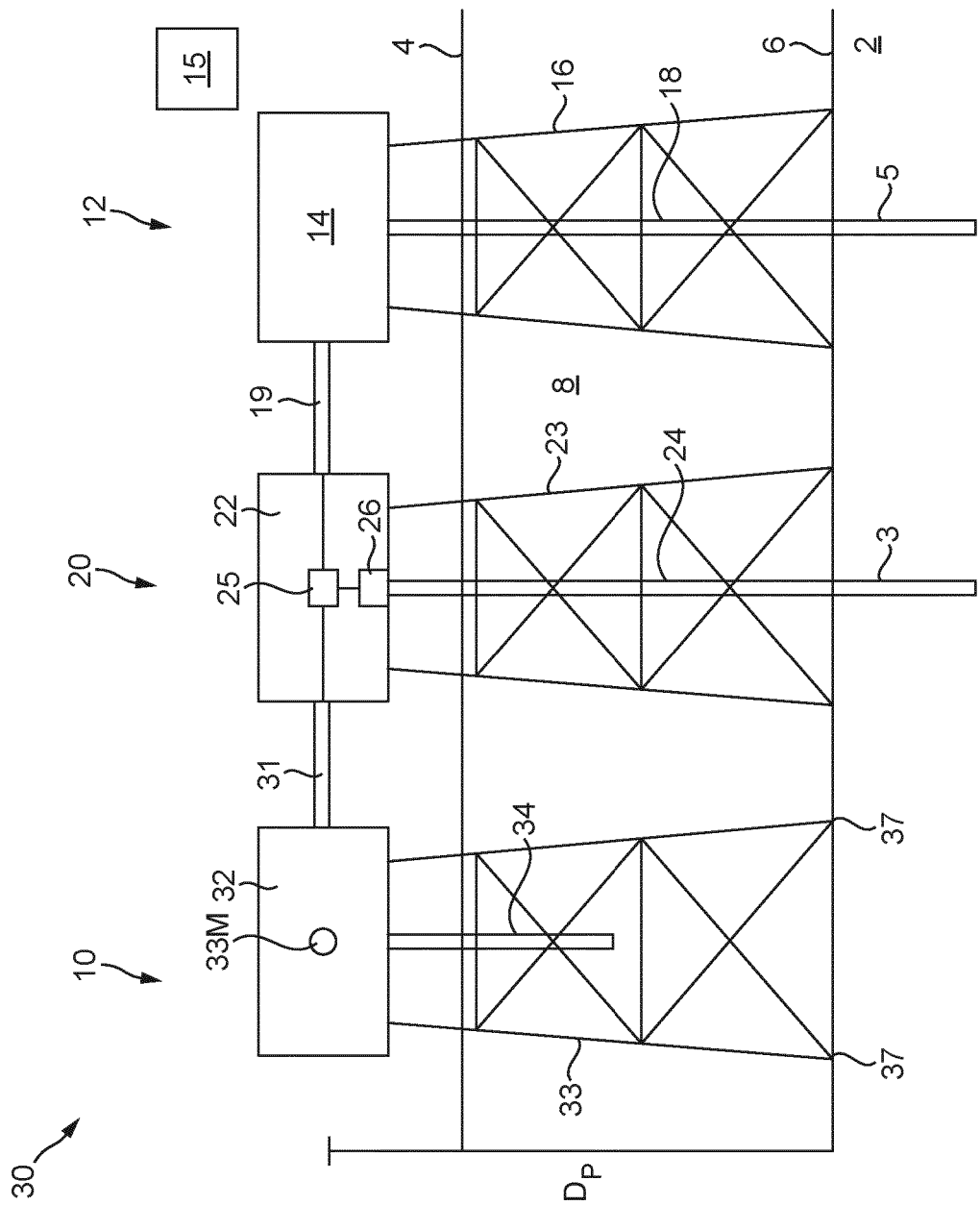
FIG. 1 is a schematic view of an embodiment of an integrated system for providing low salinity injection water in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims will be made for purposes of clarity, with "up", "upper", "upwardly" or "upstream" meaning toward the surface of the borehole and with "down", "lower", "downwardly" or "downstream" meaning toward the terminal end of the borehole, regardless of the borehole orientation.

Definitions

Throughout the following description, the following terms are referred to:

"High salinity feed water" is the feed water for a desalination plant and is typically seawater (SW), estuarine water, aquifer water or mixtures thereof.

An "ultrafiltration (UF) filtration unit" comprises a pressure vessel containing one or more UF elements; preferably, between 1 and 8 membrane elements and, in particular, between 1 and 3 UF membrane elements.

A "reverse osmosis (RO) membrane separation unit" comprises a pressure vessel, alternatively called a housing, containing one or more RO membrane elements; preferably, between 1 and 8 RO membrane elements and, in particular, between 2 and 6 RO membrane elements.

A "nanofiltration (NF) filtration unit" comprises a pressure vessel containing one or more NF elements; preferably, between 1 and 8 membrane elements and, in particular, between 4 and 8 NF membrane elements.

An "ultrafiltration (UF) stage of a desalination plant" is a group of UF filtration units connected together in parallel. Similarly, a "reverse osmosis (RO) stage of a desalination plant" is a group of RO membrane separation units connected together in parallel, and a "nanofiltration (NF) stage of a desalination plant" is a group of NF filtration units connected together in parallel.

A "membrane block" comprises stages of RO membrane separation and NF filtration connected together to provide concentrate staging and typically shares common valving and piping. A membrane block of two or more membrane blocks may be mounted on a support structure.

"Produced water (PW)" is water separated from oil and gas at a production facility. Produced water may comprise connate water, invading aquifer water from an underlying aquifer or any previously injected aqueous fluid such as seawater (SW).

"Connate water" is the water present in the pore space of an oil-bearing layer of a reservoir.

"Quality of the produced water (PW) blending stream" relates to the total dissolved solids content and/or the concentrations of individual ions or types of individual ions and/or ratios of individual ions or ratios of types of individual ions in the PW.

"TDS content" is the total dissolved solids content of an aqueous stream and typically has units of mg/L.

The present disclosure relates to an integrated system and a method for producing a blended low salinity injection water comprising variable amounts of produced water or a variable quality of produced water while maintaining the composition of the blended low salinity injection water within a predetermined operating envelope for the main phase of a low salinity waterflood that balances maximizing enhanced oil recovery from the reservoir while minimizing the risk of formation damage, souring or scaling of the reservoir.

Referring to FIG. 1, an embodiment of an integrated system 10 for producing a low salinity injection water for a reservoir having an oil-bearing layer 2 penetrated by at least one injection well 3 and at least one production well 5. In the embodiment of FIG. 1, integrated system 10 generally includes a production system 12, an injection system 20, and a desalination system 30. Production system 12 of the integrated system 10 generally includes a production facility or platform 14 disposed above the waterline 4 and supported by a support structure 16 extending between the production platform 14 and the sea floor 6. Production platform 14 is in fluid communication with production well 5 via a production line or riser 18 extending between production platform 14 and production well 5. Additionally, the production platform 14 of production system 12 includes a produced water (PW) flowline 19 in fluid communication with injection system 20. During operation of integrated system 10, fluids produced from the production well 5 are passed to the production platform 14 via production line 18. The produced fluids are separated in the production platform 14 into an oil stream, a gaseous stream, and a PW blending stream. The PW blending stream flows to injection system 20 via PW flowline 19 for processing via injection system 10 before being injected into the injection well 3.

In this embodiment, injection system 20 generally includes an injection facility or platform 22 disposed above the waterline 4 and supported by a support structure 23 extending between the production platform 22 and the sea floor 6. Although in this embodiment injection system 20 includes injection platform 22, in other embodiments, injection system 20 may be supported on a floating vessel such as a ship or spar. Injection platform 22 is in fluid communication with injection well 3 via an injection line or riser 24 extending between injection platform 22 and injection well 3. In this embodiment, injection platform 22 of injection system 20 includes a blending system or manifold 25 in fluid communication with PW flowline 19 and a permeate flowline 31 extending between desalination system 30 and injection platform 22. Blending manifold 25 of injection platform 22 is configured to blend the PW blending stream provided by PW flowline 19 with a permeate blending steam provided by permeate flowline 31 to form a blended low salinity injection water stream. In some embodiments, a concentrate may be added to the blended low salinity injection water stream to adjust the ionic balance of the low salinity injection water stream and thereby minimize the risk of formation damage due to low salinity clay swelling. Injection platform 22 further includes one or more high pressure injection pumps 26 for pumping the low salinity injection water stream formed by blending manifold 25 into injection well 3 via injection riser 24.

In this embodiment, integrated system 10 additionally includes a control system 15 configured to control the operation of injection system 20 and/or a desalination system to thereby control the composition of the low salinity injection water stream pumped into injection well 3 from the injection platform 22 of injection system 20. Boundary values for the composition of the low salinity injection water stream may be inputted into the control system 15, where the boundary values define an operating envelope for the composition of the low salinity injection water stream. The operating envelope may be defined by boundary values (upper and lower limits) for one or more of the total dissolved solids (TDS) content (salinity), ionic strength, the concentrations of individual ions (such as sulfate anions, nitrate anions, calcium cations or magnesium cations), the concentrations of types of individual ions (such as monovalent cations, monovalent anions, multivalent anions, multivalent cations, or divalent cations), ratios of types of individual ions, or ratios of individual ions (such as Sodium Adsorption Ratio).

Sodium Adsorption Ratio (SAR) is used to assess the state of flocculation or of dispersion of clays in the reservoir rock. Typically, sodium cations facilitate dispersion of clay particles while calcium and magnesium cations promote their flocculation. A formula for calculating the Sodium Adsorption Ratio (SAR) is presented below in equation (1), where sodium, calcium, and magnesium cation concentrations of the low salinity injection water stream are expressed in milliequivalents per litre:

$$SAR = \frac{[Na^+]}{\sqrt{(0.5[Ca^+] + [Mg^+])}} \quad (1)$$

Compositions within the operating envelope of the low salinity injection water stream are those predicted to achieve enhanced oil recovery (EOR) from the reservoir while avoiding or minimizing the risk of formation damage. Where there is a souring risk or scaling risk for the oil bearing layer of the reservoir, compositions within the operating envelope are preferably those that are also predicted to mitigate reservoir souring or to inhibit scaling. The person skilled in the art will understand that not all reservoirs present a souring risk or a scaling risk. Thus, souring may occur when a reservoir contains an indigenous population of sulfate reducing bacteria that obtain energy by oxidizing organic compounds while reducing sulfate to hydrogen sulfide. Scaling may occur when a connate water containing high levels of precipitate precursor cations, such as barium and strontium cations, mixes with an injection water containing relatively high amounts of sulfate anions, resulting in the precipitation of insoluble sulfate salts (mineral scales).

Different boundary values for each parameter may be inputted into the control system 15, thereby defining different operating envelopes for the composition of the low salinity injection water where the different operating envelopes balance different levels of EOR with different levels of risk of formation damage, reservoir souring or scaling. In order to maintain the composition of the low salinity injection water stream within a predefined or predetermined operating envelope, the amounts permeate stream blended with the PW stream via blending manifold 25 may be adjusted in real time by control system 15 in response to changes (increases or decreases) in the amount or flow rate of the PW stream to be disposed of in the low salinity injection water stream or changes in the quality (increases or decreases in the TDS content, concentration of one or more individual ions, concentration of one or more types of individual ions, a ratio of individual ions or a ratio of types of individual ions) of the PW. In some embodiments, control system 15 is configured to selectably add or inject site specific ions as a concentrate to the low salinity injection water stream to balance the ionic composition and to prevent, or at least reduce, the risk of clay swelling and formation damage.

In this embodiment, the desalination system 30 of integrated system 10 generally includes a desalination facility or platform 32 disposed above the waterline 4 and supported by a support structure 33 extending between the desalination platform 32 and the sea floor 6. Desalination platform 32 is in fluid communication with a body of water 8 (e.g., the sea) positioned between the waterline 4 and sea floor 6 via a feed or inlet conduit 34 that extends between the body of water 8 and the desalination platform 32. During operation of integrated system 10, an input or feed water stream comprising high salinity feed water supplied to desalination platform 32 by feed conduit 34 is treated by equipment of desalination system 30 to thereby form the permeate stream provided to injection system 20 via permeate flowline 31.

Desalination platform 32 has a center of mass 33M disposed at a vertical distance $D_p$ above the sea floor 6. The support structure 33 of desalination system 30 is coupled or affixed to the sea floor 6 at a foundation 37. In this configuration, it may be advantageous to minimize the distance $D_p$ between the center of mass 33M of desalination platform 32 and the sea floor 6 to increase the stability of desalination platform 32 and support structure 33 (e.g., to decrease buckling and/or bending loads resulting from interactions between desalination platform 32 and support structure 33 and the surrounding environment). For example, a desalination platform having an elevated center of mass may require a more robust and expensive support structure in order to provide adequate stability for the desalination platform. Thus, by minimizing the distance $D_p$ between the center of mass 33M of desalination platform 32 and the sea floor 6, adequate stability may be provided for the desalination platform 32 while minimizing the costs associated with constructing, transporting, and maintaining support structure 33. For similar reasons, minimizing the mass or weight of desalination platform 32 may also provide a means for saving costs associated with the construction, transportation, and maintenance of support structure 33 while providing adequate stability and structural support for desalination platform 32.

Figure 2:
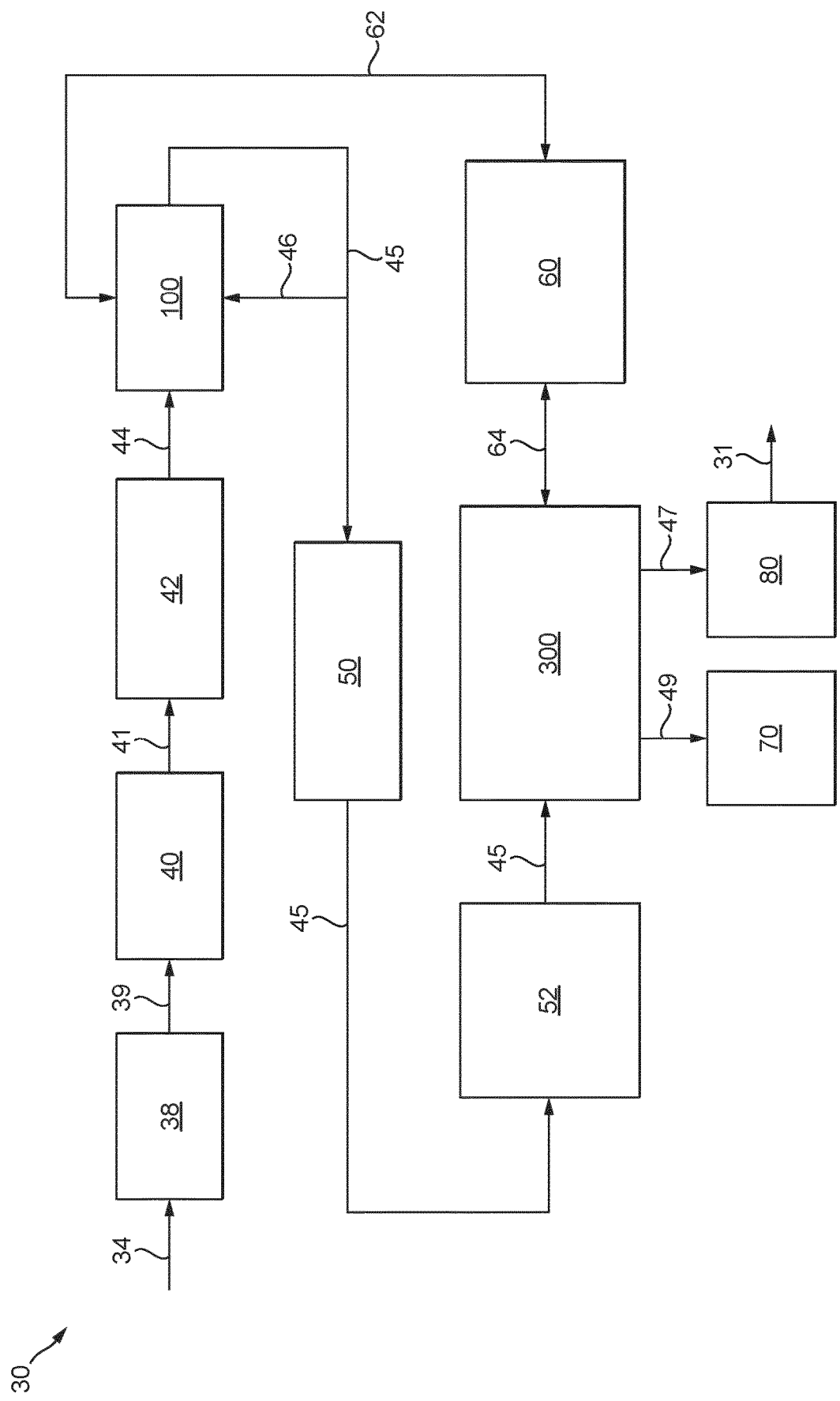
FIG. 2 is a schematic view of an embodiment of a desalination system of the integrated system of FIG. 1 in accordance with the principles disclosed herein.

Referring to FIGS. 1 and 2, a schematic representation of the desalination system 30 of the integrated system 10 of FIG. 1 is shown in FIG. 2. In the embodiment of FIGS. 1 and 2, the desalination system 30 of integrated system 10 generally includes one or more feed water lift pumps 38, a filter array 40, a heat exchanger array 42, a fine filtration stage 100, a buffer tank 50, one or more high pressure pumps 52, a cleaning-in-place (CIP) skid 60, a membrane block 300, a dump tank 70, and a deaerator 80. Lift pumps 38 are configured to lift or pump a feed water stream (e.g., seawater) from the body of water 8 via feed conduit 34. Filter array 40 is in fluid communication with a discharge 39 of high pressure pumps 38 and is configured to filter particulates entrained in the feed water stream provided by high pressure pumps 38, thereby providing a filtered feed water stream 41 at an outlet thereof. In this embodiment, filter array 40 comprises one or more 80 micron filters; however, in other embodiments, the configuration of filter array 40 may vary. The filtered feed water stream 41 is provided to heat exchanger array 42 where the filtered feed water stream 41 is heated prior to flowing to fine filtration stage 100 as a heated feed water stream 44. In this embodiment, heat exchanger array 42 comprises one or more plate heat exchangers configured to heat the filtered feed water stream to a temperature of at least 20° Celsius; however, in other embodiments, the configuration and functionality of heat exchanger array 42 may vary. The heating of filtered feed water stream 41 by heat exchanger 42 increases production at the same feed pressure of the feed water stream 41 to thereby reduce the weight of the desalination system 30

As will be described further herein, fine filtration stage 100 includes a plurality of UF skids, each UF skid including a plurality of UF filtration units connected together in parallel and mounted to a common support structure. In some embodiments, fine filtration stage 100 comprises microfiltration (MF) skids including a plurality of MF filtration units. In other embodiments, fine filtration stage 100 comprises a combination of MF skids and UF skids, and/or a plurality of fine filtration skids each including a plurality of UF and MF filtration units. The UF filtration units of fine filtration stage 100 operate in "dead end" and are generally configured to reject particulates, colloids, microbes, viruses, and other contaminants from the filtered feed water stream 44 provided to the fine filtration stage 100 from heat exchanger array 42. In this manner, fine filtration stage 100 discharges an UF filtrate stream 45 that is formed from the heated feed water stream 44 supplied thereto. In some embodiments, the UF filtration units of fine filtration stage 100 are configured to reject materials having a molecular weight as low as approximately 1,000 grams/mole to 150,000 grams/mole; however, in other embodiments, the configuration of the UF filtration units of fine filtration stage 100 may vary.

The UF filtrate stream 45 discharged from fine filtration stage 100 is fed to a buffer tank 50. In some embodiments, buffer tank 50 may have a volume of approximately between 20 meters cubed to 40 meters cubed; however, in other embodiments, the volume of buffer tank 50 may vary. In certain embodiments, the volume of buffer tank 50 is between two times to four times the volume required to backwash the UF filtration units of a single UF skid. Additionally, a portion of UF filtrate stream 45 may be returned periodically to fine filtration stage 100 as a backwash stream 46 for back-washing or cleaning the UF filtration units of fine filtration stage 100. In this embodiment, UF filtrate stream 45 is pumped from buffer tank 50 to an inlet of membrane block 300 via one or more high pressure pumps 52 positioned between buffer tank 50 and the membrane block 300.

As will be described further herein, membrane block 300 includes a plurality of RO arrays and a plurality of NF arrays, each RO array including a plurality of RO membrane separation units connected together in parallel and mounted to a common support structure along with an NF array including a plurality of NF filtration units connected together in parallel. The NF filtration units of the membrane block 300 operate in cross-flow and are generally configured to reject nanometer sized particles having a molecular weight as low as approximately 100 grams/mole to 1,000 grams/mole; however, in other embodiments, the configuration of the NF filtration units of membrane block 300 may vary. The RO membrane separation units of the membrane block 300 operate in cross-flow and are generally configured to reject ionic contamination, micro-organisms, particulates, and other materials having a molecular weight as low as 300 grams/mole to less than 100 grams/mole; however, in other embodiments, the configuration of the RO membrane separation units of membrane block 300 may vary.

The membrane block 300 of desalination system 30 discharges a combined permeate stream 47 that is formed from the UF filtrate stream 45 supplied thereto. Combined permeate stream 47 is discharged from membrane block 300 to deaerator 80, and from deaerator 80 to the injection system 20 via permeate flowline 31 for blending with the PW steam provided by production system 12 via the blending manifold 25 of injection system 20. A combined reject or concentrate stream 49 is directed towards dump tank 70 for dumping. In some embodiments, dump tank 70 may comprise a caisson of the desalination platform 32 of desalination system 30. In some embodiments, membrane reject stream 49 is discharged through an energy recovery device to reduce energy usage.

The CIP skid 60 is configured for cleaning the UF skids of fine filtration stage 100 and the RO and NF arrays of membrane block 300. CIP skid 60 is in fluid communication with fine filtration stage 100 via CIP conduits 62 while CIP skid 60 is in fluid communication with membrane block 300 via CIP conduits 64. In this arrangement, fluid may be flowed between CIP skid 60 and the fine filtration stage 100 and membrane block 300 to clean stage 100 and block 300. Particularly, CIP skid 60 includes a tank and one or more pumps for circulating fluid.

Figure 3:
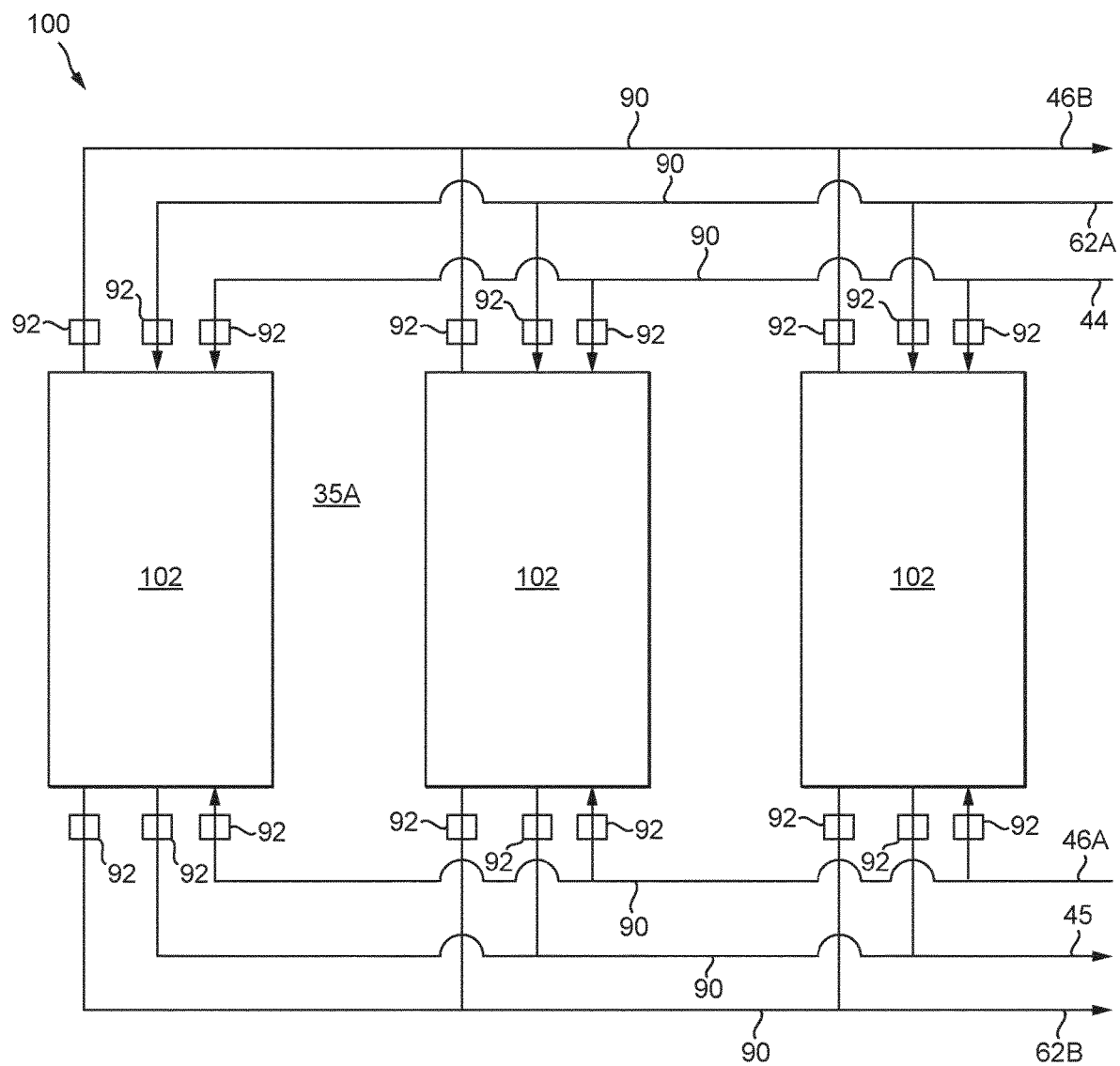
FIG. 3 is a schematic view of an embodiment of a fine filtration stage of the desalination system of FIG. 2 in accordance with the principles disclosed herein.
Figure 4:
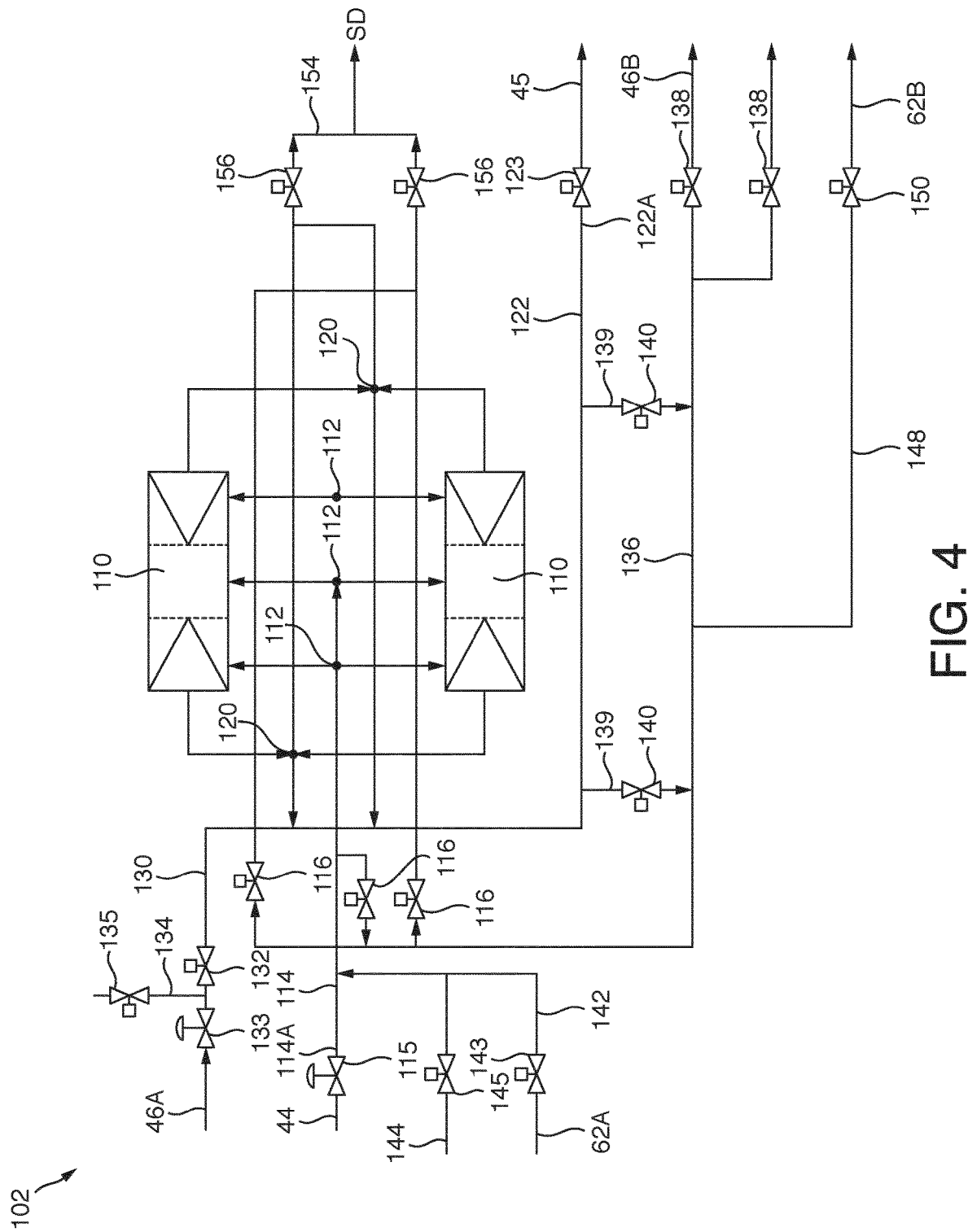
FIG. 4 is a schematic view of an embodiment of an ultrafiltration (UF) skid of the fine filtration stage of FIG. 3 in accordance with the principles disclosed herein.

Referring to FIGS. 1-3, a schematic representation of the fine filtration stage 100 of the desalination system 30 of FIGS. 1 and 2 is shown in FIG. 3. In the embodiment of FIGS. 1-3, fine filtration stage 100 includes a plurality of UF skids 102 connected in parallel. As will be described further herein, each UF skid 102 comprises a plurality of UF filtration units connected in parallel. Each UF skid 102 receives heated feed water stream 44 (which results in a technical benefit by having the feed enter simultaneously via both the end inlet side ports and the center port to optimize membrane usage) and produces or discharges UF filtrate stream 45. Additionally, each UF skid 102 receives a backwash inlet stream 46A, where backwash inlet stream 46A comprises a portion of the filtrate stream 45. Each UF skid 102 discharges a backwash outlet stream 46B (which results in a technical benefit by taking the backwash sequentially from each of the 3× side ports) that flows to a drain of the desalination platform 32. A CIP inlet stream 62A flows from CIP skid 60 to each UF skid 102 while a CIP return stream 62B flows from each UF skid 102 to the CIP skid 60. The CIP inlet stream 62A includes water and chemicals for the chemical cleaning and flushing of the UF filtration units housed in each UF skid 102. In this embodiment, streams 44, 45, 46A, 46B, 62A, and 62B are each conducted or flow through one of a plurality of interconnecting pipeworks 90 extending across the first deck 35A, where each of interconnecting pipeworks 90 are disposed on, and supported by pipe supports 92 disposed on the first deck 35A.

Figure 5:
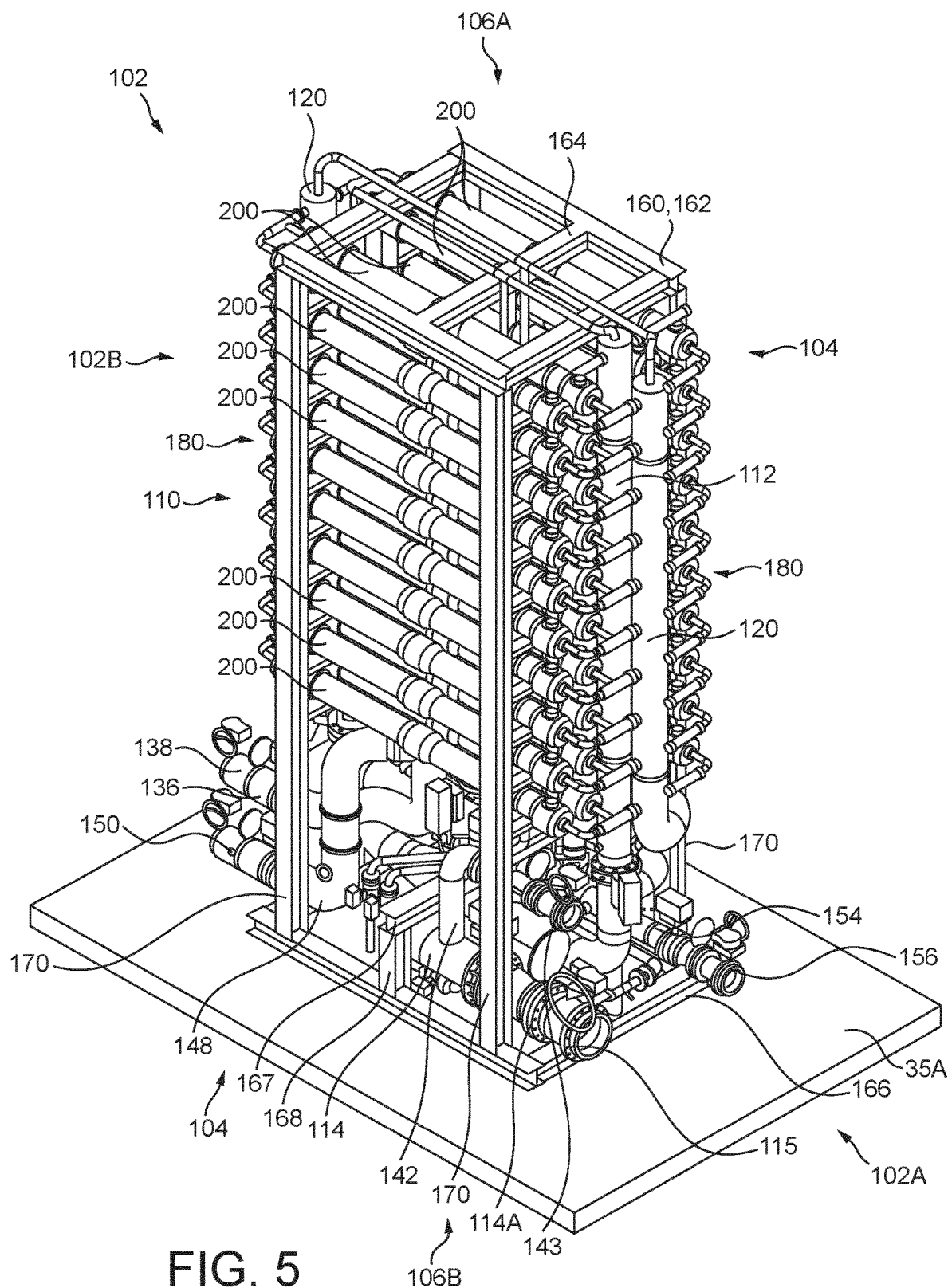
FIGS. 5-11 are perspective views of the UF skid of FIG. 4.
Figure 6:
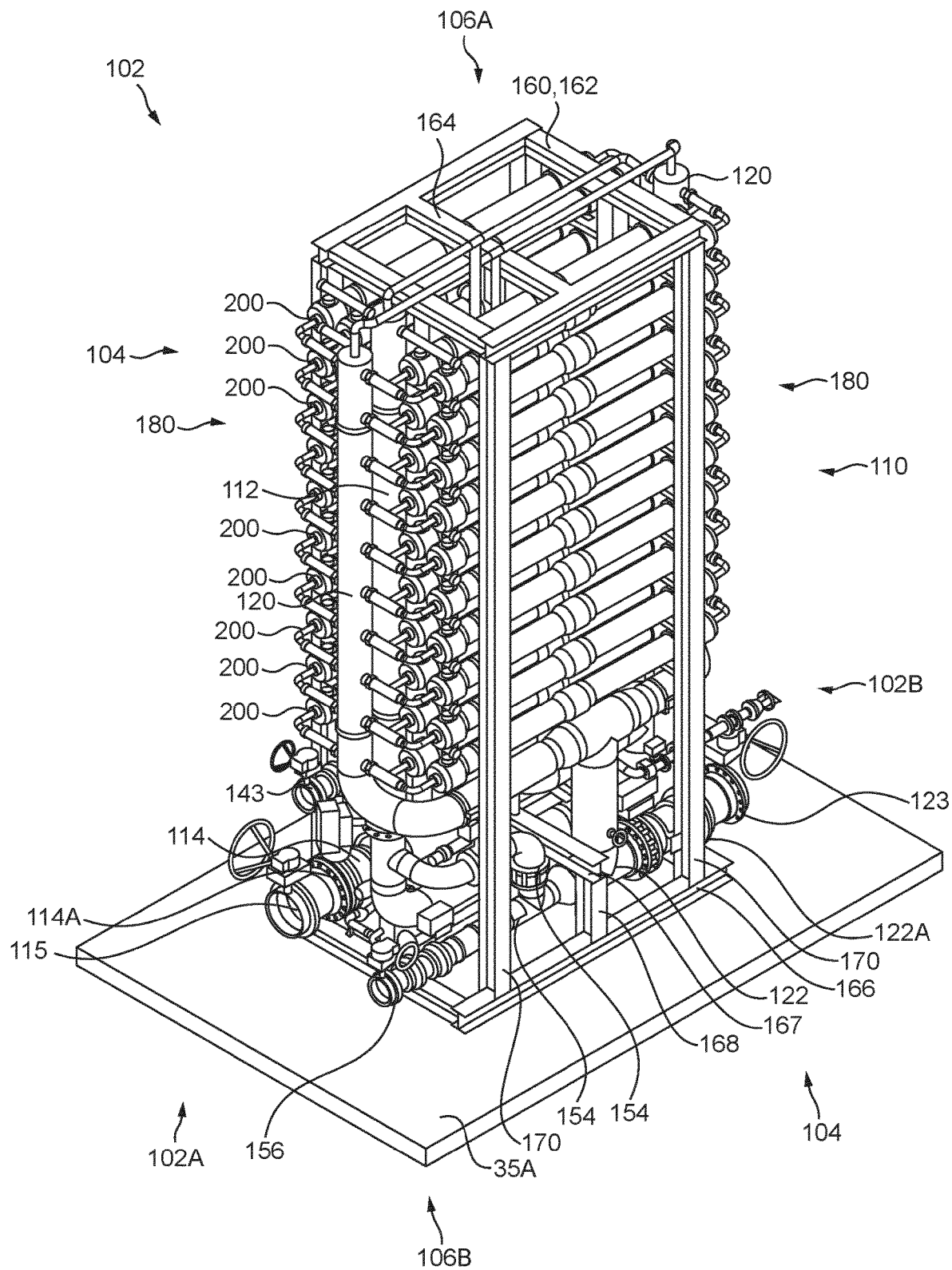
Figure 7:
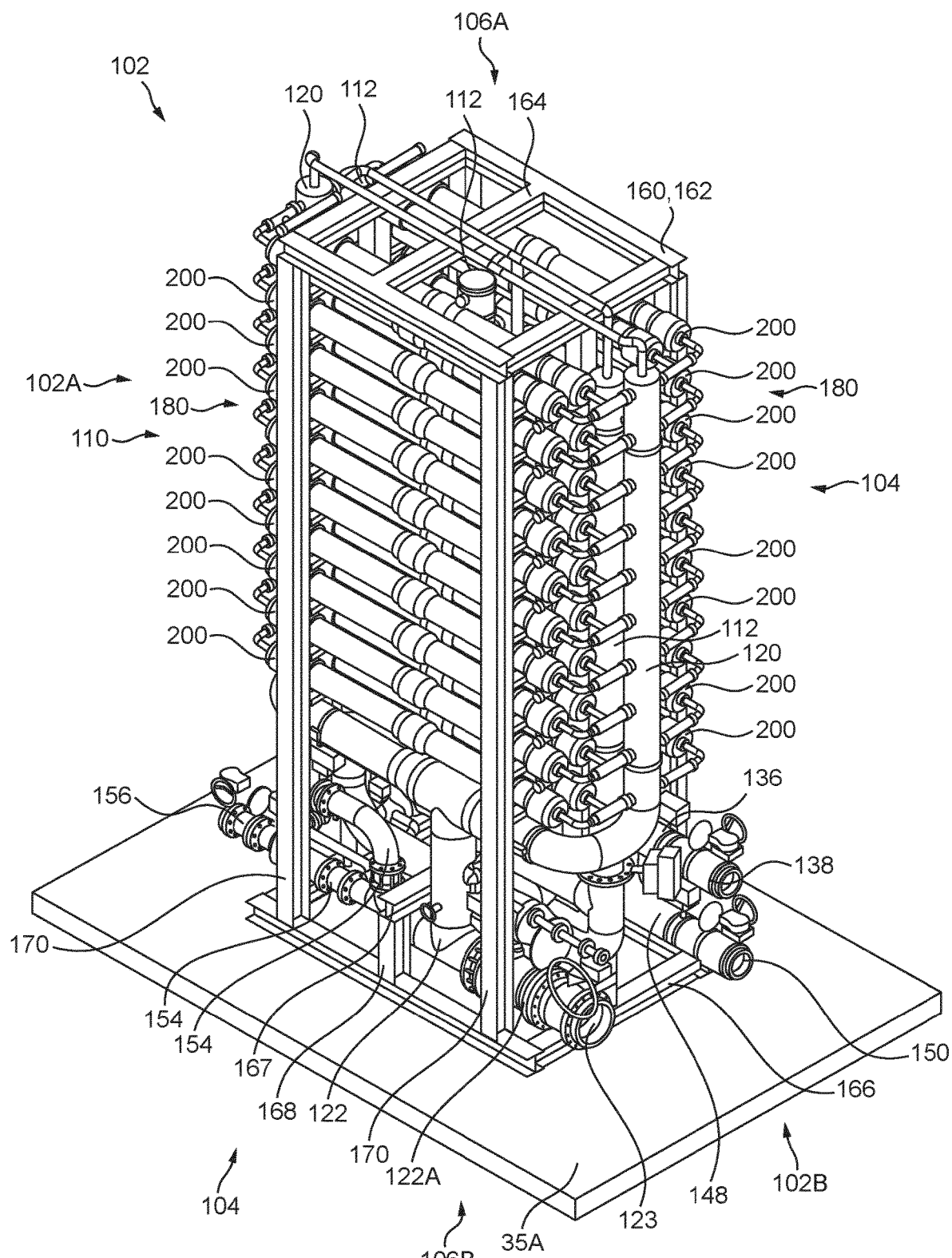
Figure 8:
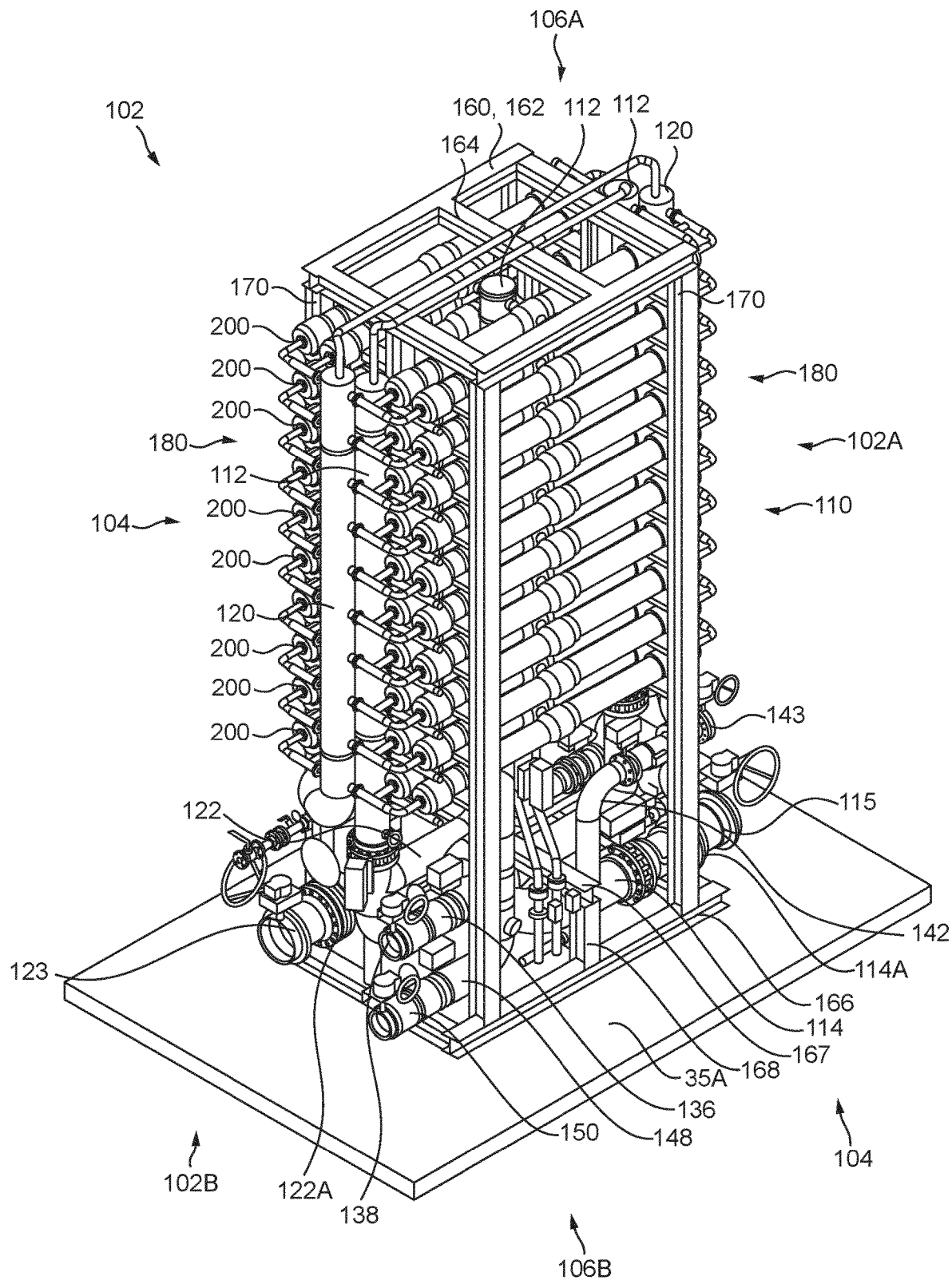
Figure 10:
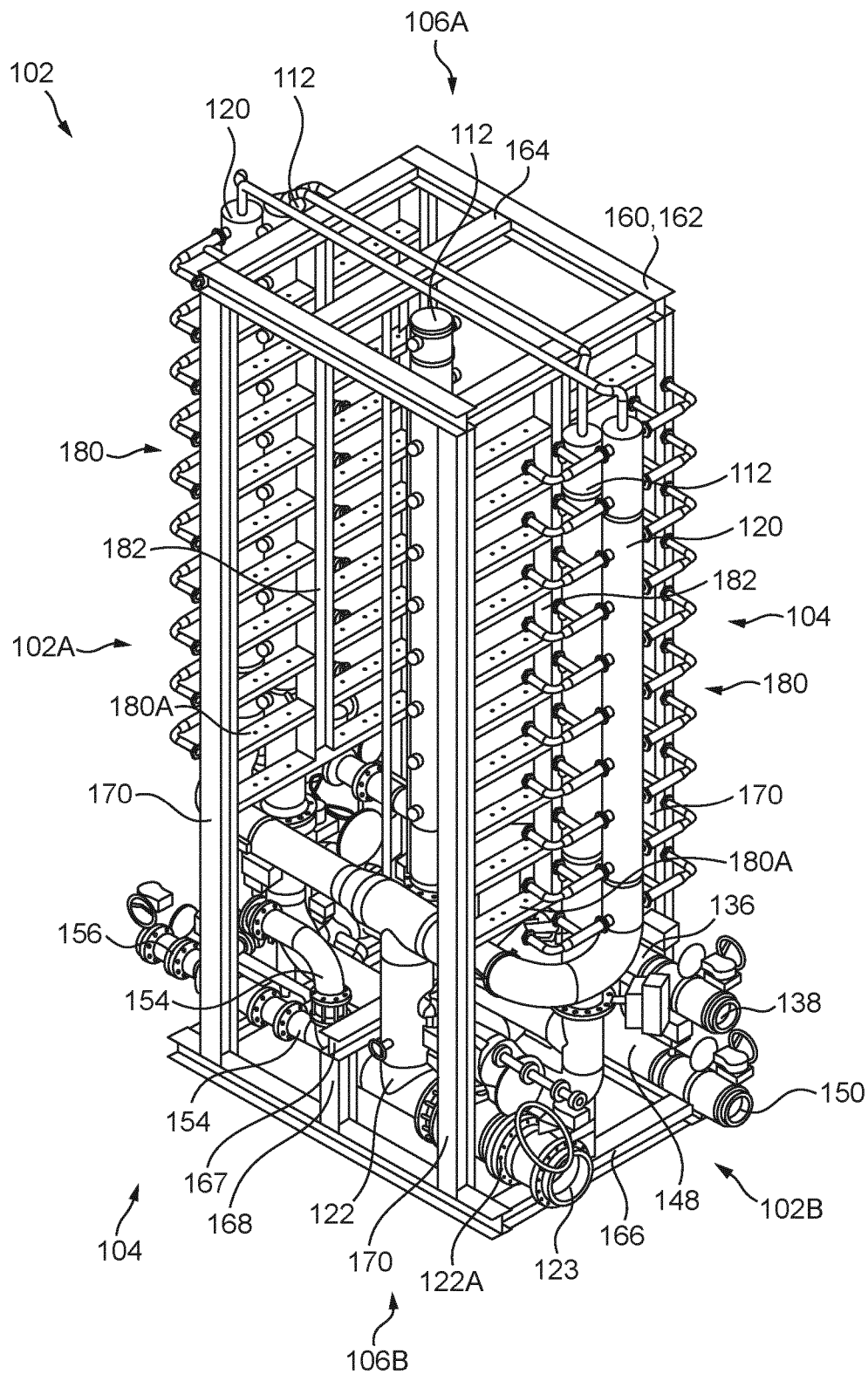
Figure 11:
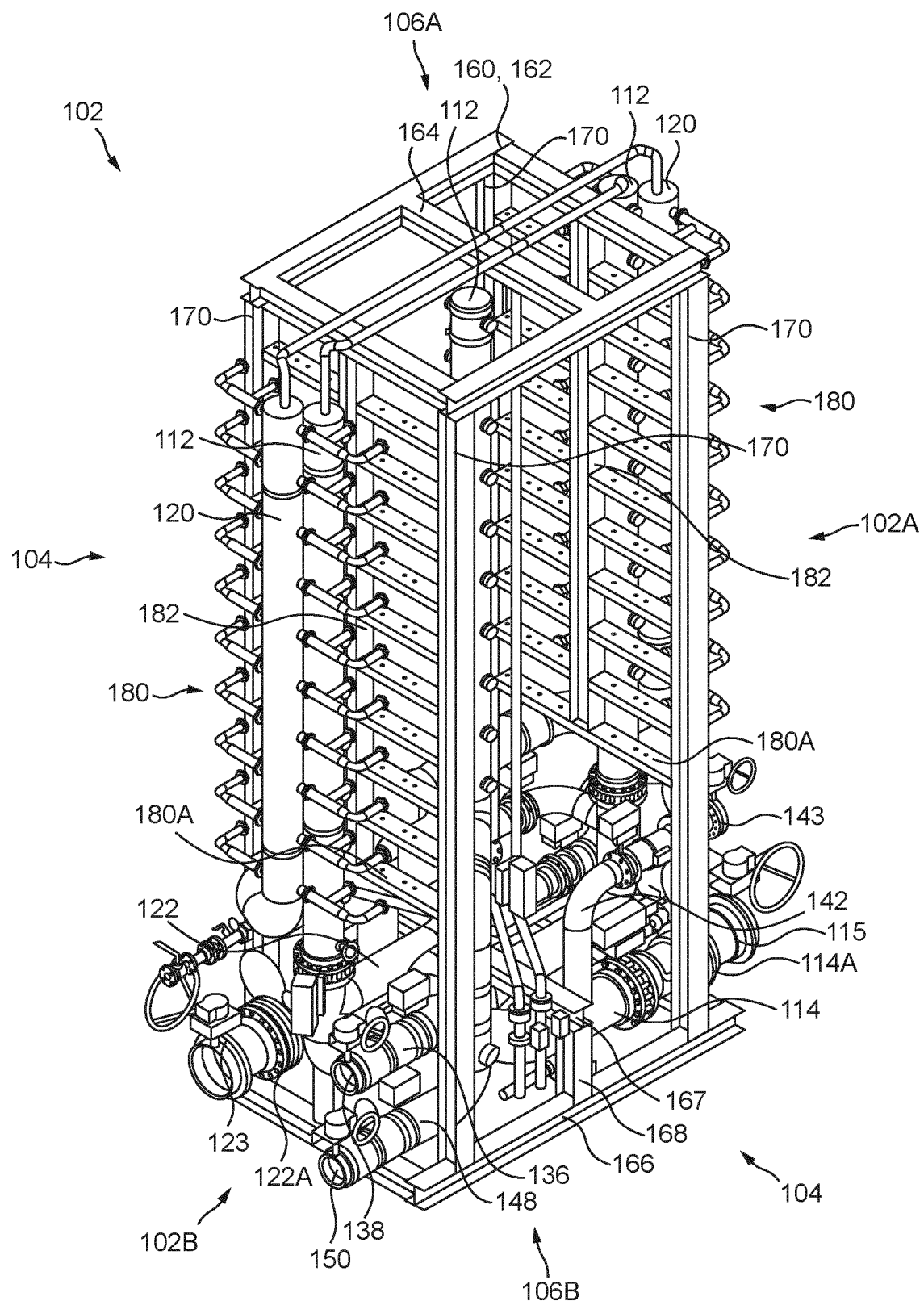
Figure 12:
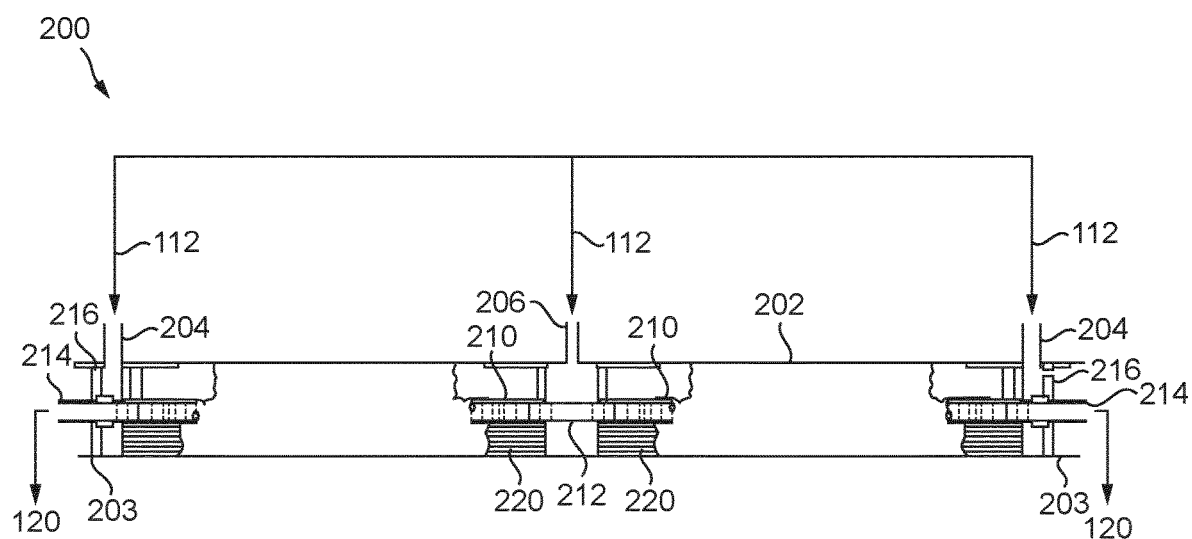
FIG. 12 is a partial cross-sectional view of an embodiment of an UF filtration unit of the UF skid of FIG. 4 in accordance with the principles disclosed herein.

Referring to FIGS. 4-12, views of an embodiment of a UF skid 102 of the fine filtration stage 100 of FIGS. 2 and 3 are shown in FIGS. 4-11 while an embodiment of a UF filtration unit 200 is shown in FIG. 12. Referring to FIG. 5, UF skid 102 is supported on a deck 35A of desalination platform 32 and has a first end 102A, a second end 102B opposite first end 102A, a pair of opposing lateral sides 104, a top or upper end 106A, and a base or lower end 106B. UF skid 102 generally includes a rack 110 of UF filtration units 200 (for clarity, UF filtration units 200 are hidden in FIGS. 9-11), a plurality of vertically extending inlet feed headers or manifolds 112, a plurality of vertically extending filtrate discharge headers or manifolds 120, and a support structure or frame 160 that physically supports the rack 110 of UF filtration units 200 and the manifolds 110 and 120. In the embodiment of FIGS. 4-12, the UF filtration units 200 of rack 110 are arranged in ten rows, one above another with each row comprised of four UF filtration units 200; however, in other embodiments, the number and arrangement of UF filtration units 200 of UF skid 102 may vary. In this embodiment, three inlet feed headers 112 are spaced between ends 102A, 102B of UF skid 102, including two inlet feed headers 112 positioned at ends 102A, 102B, and one inlet feed header positioned equidistantly between ends 102A, 102B. Additionally, each inlet feed header 112 is positioned equidistantly between lateral sides 104 with one UF filtration unit 200 being positioned or between each pair of inlet feed headers 112.

As shown particularly in FIG. 12, each UF filtration unit 200 of UF skid 102 comprises a cylindrical filtration vessel 202 and a plurality of hollow fiber UF filtration elements or membranes 220 housed therein. In this embodiment, filtration vessel 202 extends axially between a pair of opposing ends 203, and includes a pair of radial outer ports 204 positioned proximal to ends 203, and a radial central port 206 positioned equidistantly between ends 203. UF filtration unit 200 additionally includes a pair of perforated tubes 210 disposed centrally within filtration vessel 202. Each tube 210 extends from an end 203 of filtration vessel 202, and tubes 210 are joined via a central connector 212. An outer end of each tube 210 is coupled to an axial end-port 214. Each UF filtration element 220 is disposed in an annulus formed between an outer surface of one of the perforated tubes 210 and an inner surface of filtration vessel 202. A pair of endplates 216 disposed at each end 203 of filtration vessel 202 seal the annulus from the surrounding environment.

An inlet feed header 112 of UF skid 102 is coupled to each port 204 and 206 of filtration vessel 202 while a filtrate discharge header 120 is coupled to each end-port 214. During operation of UF filtration unit 200, heated feed water stream 44 may flow into filtration vessel 202 via inlet feed headers 112 of UF skid 102. Particularly, heated feed water stream 44 is supplied to the annular spaces formed between the outer surface of each end-port 214 and the inner surface of filtration vessel 202 via outer ports 204. Heated feed water stream 44 is also supplied to the annular space formed between the outer surface of central connector 212 and the inner surface of filtration vessel 202 via central port 206. Given that neither end-ports 214 nor central connector 212 are perforated, the heated feed water stream 44 is forced to flow axially into and radially through the fibers of each UF filtration element 220 before it may enter one of the perforated tubes 210 and exit filtration vessel 202 via one of the end-ports 214.

During backwashing of each UF filtration unit 200, UF filtrate stream 45 flows into perforated tubes 210 via filtrate discharge headers 120 and end-ports 214. The UF filtrate stream 45 then flows into the annuli formed between perforated tubes 210 and filtration vessel 202, and then radially through the fiber walls exiting axially along the fibers of the UF filtration elements 220 before sequentially exiting filtration vessel 202 via ports 204 and 206. In this manner, impurities collected in UF filtration elements 220 may be backwashed into inlet feed headers 112 and thereby removed from UF filtration elements 220.

As shown particularly in FIGS. 4-11, UF skid 102 includes inlet feed pipework 114 coupled to inlet feed headers 112, inlet feed pipework 114 extending from a terminal or inlet end 114A that is coupled to an inlet feed valve 115 for controlling the inlet of heated feed water stream 44 to inlet feed headers 112 and UF filtration units 200. UF skid 102 also includes filtrate discharge pipework 122 coupled to filtrate discharge headers 120, filtrate discharge pipework 122 extending from a terminal or discharge end 122A that is coupled to an permeate discharge valve 123 for isolating the discharge of UF filtrate stream 45 from the UF skid 102. As shown particularly in FIG. 4, in this embodiment, additional inlet pipework valves 116 are disposed along inlet feed pipework 114 for controlling fluid flow through inlet feed pipework 114.

UF skid 102 includes a backwash inlet pipework 130 connected to the filtrate discharge pipework 122 and a backwash discharge pipework 136 connected to inlet feed pipework 114, where a backwash inlet valve 132 is disposed along backwash inlet pipework 130 for isolating the UF skid 102 from backwash stream 46. Pipework valves 116 are configured for sequentially directing the flow of backwash stream 46 through the UF filtration elements 200 to maximize backwash efficacy. Additionally, a plurality of backwash discharge valves 138 are disposed along backwash discharge pipework 136 for controlling fluid flow therethrough to waste. In this embodiment, fine filtration stage 100 includes a remotely positioned valve 133 for isolating each UF skid 102 of fine filtration stage 100 from the backwash stream 46. In this embodiment, a chemical injection line 135 is connected to backwash inlet pipework 130 between backwash inlet valve 132 and the remotely positioned valve 133, a chemical injection valve 135 being disposed along chemical injection line 134 for controlling fluid flow therethrough. Chemical injection line 134 provides for the injection of chemicals, such as hypochlorite or other chemicals configured to assist in the cleaning and disinfection of UF filtration units 200, into the UF filtrate stream 45 flowing through backwash inlet pipework 130 during the backwashing of UF skid 102. Additionally, in some embodiments, a non-oxidizing disinfectant may be injected to the heated feed water stream 44 up stream of inlet feed valve 115. Additionally, in this embodiment, a plurality of branch conduits 139, with a branch valve 140 disposed along each branch conduit 139, extend between filtrate discharge pipework 122 and backwash discharge pipework 136 and a CIP discharge pipework 148 of UF skid 102 to assist with the drainage of filtrate discharge pipework 122 and the filtrate discharge headers 120 coupled therewith.

UF skid 102 includes a CIP inlet pipework 142 connected with inlet feed pipework 114 and including a CIP inlet valve 143 for selectably admitting fluid from CIP assembly to inlet feed pipework 114. In this embodiment, an air injection pipework 144, including an air injection valve 145 disposed along air injection pipework 144, is connected to CIP inlet pipework 142 for testing the integrity of the installed UF skid 102. UF skid 102 also includes a CIP discharge pipework 148 connected to backwash discharge pipework 136. A CIP discharge valve 150 is disposed along CIP discharge pipework 148 for controlling the flow of fluid from CIP discharge pipework 148 to CIP assembly 60. UF skid 102 additionally includes a vent pipework 154 connected to both the inlet feed headers 112 and the filtrate discharge headers 120 for removing air from the UF filtration units 200 and headers 112 and 120. Drainage valves 156 are disposed along the drainage pipework to provide a common opening for the drainage pipework for controlling fluid flow therethrough. In some embodiments, one or more of the valves 115, 116, 123, 132, 135, 138, 140, 143, 145, 150, and 156 of UF skid 102 are remotely controlled by the control system 15 of integrated system 10.

Figure 9:
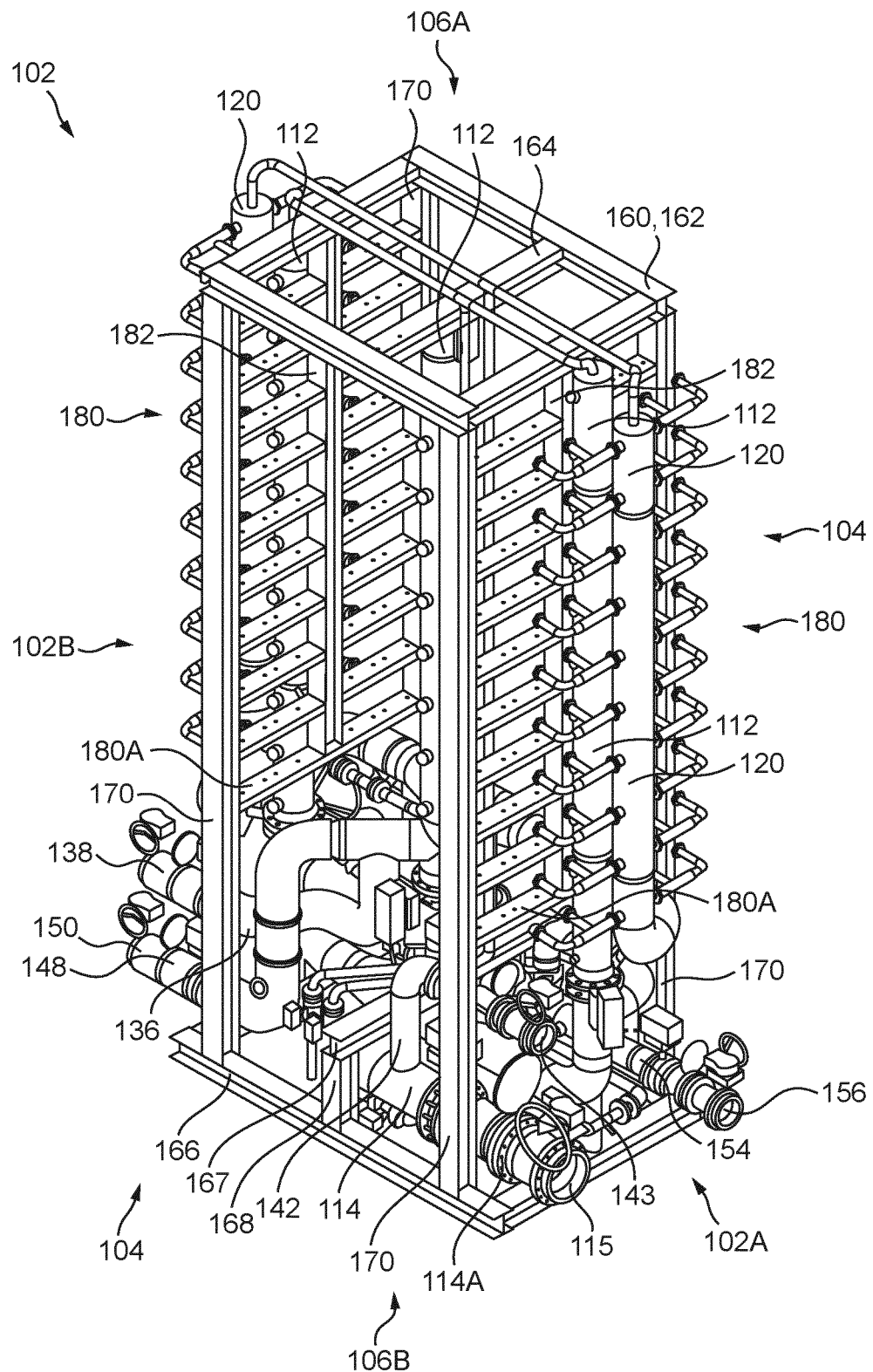

As shown particularly in FIGS. 9-11, in this embodiment, support structure 160 of UF skid 102 generally includes a rectangular upper frame 162 positioned at the top 106A of UF skid 102, a rectangular lower frame 166 positioned at the base 106B of UF skid 102, a plurality of vertical support members 170, and a plurality of support racks 180. Upper frame 162 includes a laterally extending central support member 164 disposed equidistantly between the front and rear ends 102A, 102B of UF skid 102. Lower frame 166 also includes a laterally extending support member 167 that is supported by a pair of vertical supports 168.

Each vertical support members 170 of support structure 160 is disposed at a corner of UF skid 102 and extends vertically between upper frame 162 and lower frame 166. Support racks 180 are positioned at the front and rear ends 102A, 102B of UF skid 102 and extend between lateral sides 104. Support structure 160 additionally includes a pair of vertical support 182 positioned at the ends 102A, 102B of UF skid 102, each vertical support 182 positioned equidistantly between the lateral sides 104 of UF skid 102. Each vertical support 182 extends vertically between a lowermost support rack 180A and the upper frame 162 of support structure 160, where each support rack 180 extends laterally between one of the lateral sides 104 of UF skid 102 and one of the vertical supports 182. In this embodiment, support frames 162, 166, and members 164, 167, 168, 170, and 182 each comprise metallic (e.g., carbon steel, alloy steel, etc.) I-beams; however, in other embodiments, support frames 162, 166, and members 164, 167, 168, 170, and 182 may comprise varying cross-sectional shapes and materials.

In the configuration of UF skid 102 described above, headers 112, 120 and pipeworks 114, 122, 130, 134, 136, 139, 142, 144, 148, and 154 are each directly supported by the lower frame 166 of support structure 160. Particularly, with one or more embodiments, only the rack 110 of UF filtration units 200 is directly supported by a member of support structure 160 that is elevated from the lower frame 166. The UF filtration units 200 of rack 110 contact, and are physically supported by support racks 180, which are spaced from lower frame 166. Thus, upper frame 162 of support structure 160 is not required to support the weight of headers 112, 120 and pipeworks 114, 122, 130, 134, 136, 139, 142, 144, 148, and 154. By supporting the components of UF skid 102 at the lower frame 166 thereof rather than at the upper frame 162, the total weight of support structure 160 may be minimized given that the loads supported by upper frame 162 and vertical support members 170 may, in-turn, be minimized. For example, with one or more embodiments, because the loads supported by upper frame 162 and vertical support members 170 are minimized, upper frame 162 and vertical support members 170 can be formed using lighter-weight materials. With one or more embodiments, upper frame 162 and vertical support members 170 can be constructed in a manner that reduces the total weight of support structure 160. With one or more embodiments, the center of mass of UF skid 102 is in the lower half of UF skid 102.

Additionally, valves 115, 116, 123, 132, 134, 138, 140, 143, 145, 150, and 156 of UF skid 102 are each positioned proximal to lower frame 166 and distal to upper frame 162 of support structure 160. In other words, valves 115, 116, 123, 132, 134, 138, 140, 143, 145, 150, and 156 are positioned nearer to the lower frame 166 than to the upper frame 162 of support structure 160. With valves 115, 116, 123, 132, 134, 138, 140, 143, 145, 150, and 156 of UF skid 102 positioned proximal to lower frame 166, the distance between the deck 35A and a center of mass of the UF skid 102 is minimized, thereby reducing the vertical distance $D_p$ between the sea floor 6 and the center of mass 33M of the desalination platform 32. Further, given that valves 115, 116, 123, 132, 134, 138, 140, 143, 145, 150, and 156 of UF skid 102 are positioned proximal to lower frame 166, the fluid conduits used to convey heated feed water stream 44, UF filtrate stream 45, and CIP streams 62A, 62B may each be supported by, and positioned proximal to, deck 35A (rather than suspended from above in a position distal to deck 35A), further reducing the vertical distance $D_p$ between the sea floor 6 and the center of mass 33M of the desalination platform 32. As described above, reducing the weight and lowering the center of mass 33M of the desalination platform 32 increases the stability of platform 32 and minimizes the costs associated with constructing, transporting, and maintaining support structure 33 of the desalination system 30.

Figure 13:
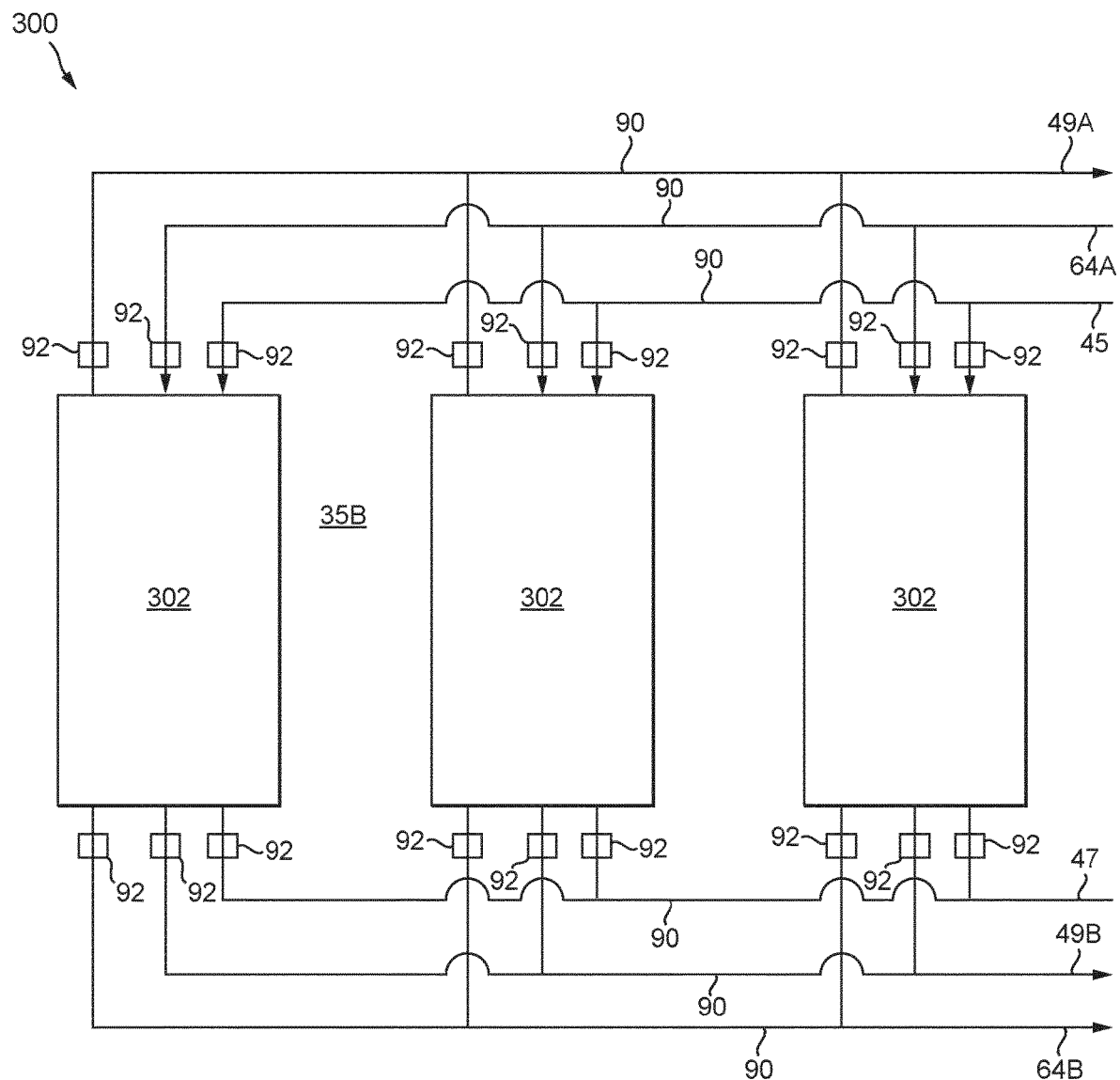
FIG. 13 is a schematic view of an embodiment of a membrane block of the desalination system of FIG. 2 in accordance with the principles disclosed herein.

Referring to FIGS. 1, 2, and 13, a schematic representation of the membrane block 300 of the desalination system 30 of FIGS. 1 and 2 is shown in FIG. 13. In the embodiment of FIG. 13, membrane block 300 includes a plurality of membrane skids 302 connected in parallel. In this embodiment, membrane block 300 includes two fewer membrane skids 302 than UF arrays 102 of the fine filtration stage 100; however, in other embodiments, the number of membrane skids 302 and UF skids 102 of the desalination system 30 may vary. As will be described further herein, each membrane skid 302 comprises a plurality of RO membrane separation units and a plurality of NF filtration units. Each membrane skid 302 receives UF filtrate stream 45 from high pressure pumps 52 and produces or discharges the combined membrane permeate stream 47, which comprises a blend of RO permeate and NF permeate, as will be described further herein. In other embodiments, each membrane skid 302 may discharge three separate permeate streams 47 (e.g., two RO permeate streams and an NF permeate stream, etc.) that are subsequently blended downstream in different proportions to achieve a desired low salinity specification; however, in other embodiments, each membrane skid 302 may discharge varying numbers of membrane permeate streams 47. Additionally, each membrane skid 302 discharges a RO reject or concentrate stream 49A and an NF reject or concentrate stream 49B, as will be described further herein, which flow to dump tank 70 of the desalination platform 32 as combined concentrate stream 49. A CIP inlet stream 64A flows from CIP skid 60 to each membrane skid 302 while a CIP return stream 64B flows from each membrane skid 302 to the CIP skid 60. The CIP inlet stream 64A includes water and chemicals for the chemical cleaning and flushing of the RO and NF filtration units housed in each membrane skid 302. In this embodiment, streams 45, 47, 49A, 49B, 64A, and 64B are each conducted through or flowed through one of the plurality of interconnecting pipeworks 90 extending across the first deck 35B, where each of interconnecting pipeworks 90 are disposed on, and supported by pipe supports 92 disposed on the first deck 35B.

Referring to FIGS. 14-22, views of an embodiment of a membrane skid 302 of the membrane block 300 of FIGS. 2 and 3 are shown in FIGS. 14-22 while an embodiment of an UF filtration unit 200 is shown in FIG. 12. Membrane skid 302 is supported on a deck 35B of desalination platform 32 and has a first end 302A, a second end 302B opposite first end 302A, a pair of opposing lateral sides 304, a top or upper end 306A, and a base or lower end 306B. In some embodiments, deck 35B of desalination platform 33 may comprise the same deck as the deck 35A on which UF skids 102 are disposed, while in other embodiments, deck 35B may comprise a deck separate from deck 35A (e.g., deck 35B may comprise a deck disposed above or below deck 35A).

Membrane skid 302 generally includes a first or Lower rack 310A of RO membrane separation units 400, a second or upper rack 310B of RO membrane separation units 400, a rack 340 of NF filtration units 420 (for clarity, RO membrane separation units 400 and NF filtration units 420 are hidden in FIGS. 19-22), a plurality of vertically extending lower inlet feed headers or manifolds 312A, a plurality of vertically extending upper inlet feed headers or manifolds 312B, a vertically extending lower permeate discharge header or manifold 320A, a vertically extending upper permeate discharge header or manifold 320B, a vertically extending lower concentrate discharge header or manifold 330A, a vertically extending upper concentrate discharge header or manifold 330B, and a support structure or frame 370 that physically supports the racks 310A, 310B, and 340 of RO membrane separation units 400 and NF filtration units 420, respectively and the manifolds 312A, 312B, 320A, 320B, 330A, and 330B. In some embodiments, rack 340 of each membrane skid 302 may comprise a rack 340 of RO membrane separation units 400. In other embodiments, racks 310A and 310B of each membrane skid 302 may comprise racks 310A and 310B of NF filtration units 420. In this embodiment, as will be described further herein, racks 310B and 340 operate in parallel, each being connected in series with respect to the lower rack 310A.

In the embodiment of FIGS. 14-22, the RO membrane separation units 400 of lower rack 310A are arranged in six rows, one above another with each row comprised of six RO membrane separation units 400; the RO membrane separation units 400 of upper rack 310B are arranged in eight rows, one above another with each row comprised of six RO membrane separation units 400; and the NF filtration units 420 of rack 340 are arranged in one row comprised of four NF filtration units 420. However, in other embodiments, the number and arrangement of RO membrane separation units 400 and NF filtration units 420 of membrane skid 302 may vary. Inlet feed headers 312A and 312B are positioned proximal the ends 302A, 302B of membrane skid 302. Permeate discharge headers 320A and 320B are each positioned proximal to the second end 302B of membrane skid 302. Concentrate discharge headers 330A and 330B are each positioned equidistantly between the ends 302A and 302B of membrane skid 302.

Each RO membrane separation unit 400 of membrane skid 302 comprises a cylindrical vessel, a perforated tube disposed within the vessel, and a plurality of RO membrane separation elements or membranes disposed radially between the perforated tube and the cylindrical vessel. Each RO membrane separation unit 400 includes a pair of outer radial ports positioned proximal to each end of the cylindrical vessel, where each outer radial port is in fluid communication with one of the inlet feed headers 312A, 312B. The cylindrical vessel also includes a central radial port positioned equidistantly between the outer radial ports, the central radial port being in fluid communication with one of the concentrate discharge headers 330A, 330B. The perforated tube of each RO membrane separation unit 400 includes an axial port at an end of the cylindrical vessel positioned proximal to the second end 302B of membrane skid 302, where the axial port is in fluid communication with one of the permeate discharge headers 320A, 320B. In this embodiment, each RO membrane separation unit 400 houses two sets of three RO separation elements; however, in other embodiments, the number of RO separation elements of each RO membrane separation unit 400 may vary.

Figure 14:
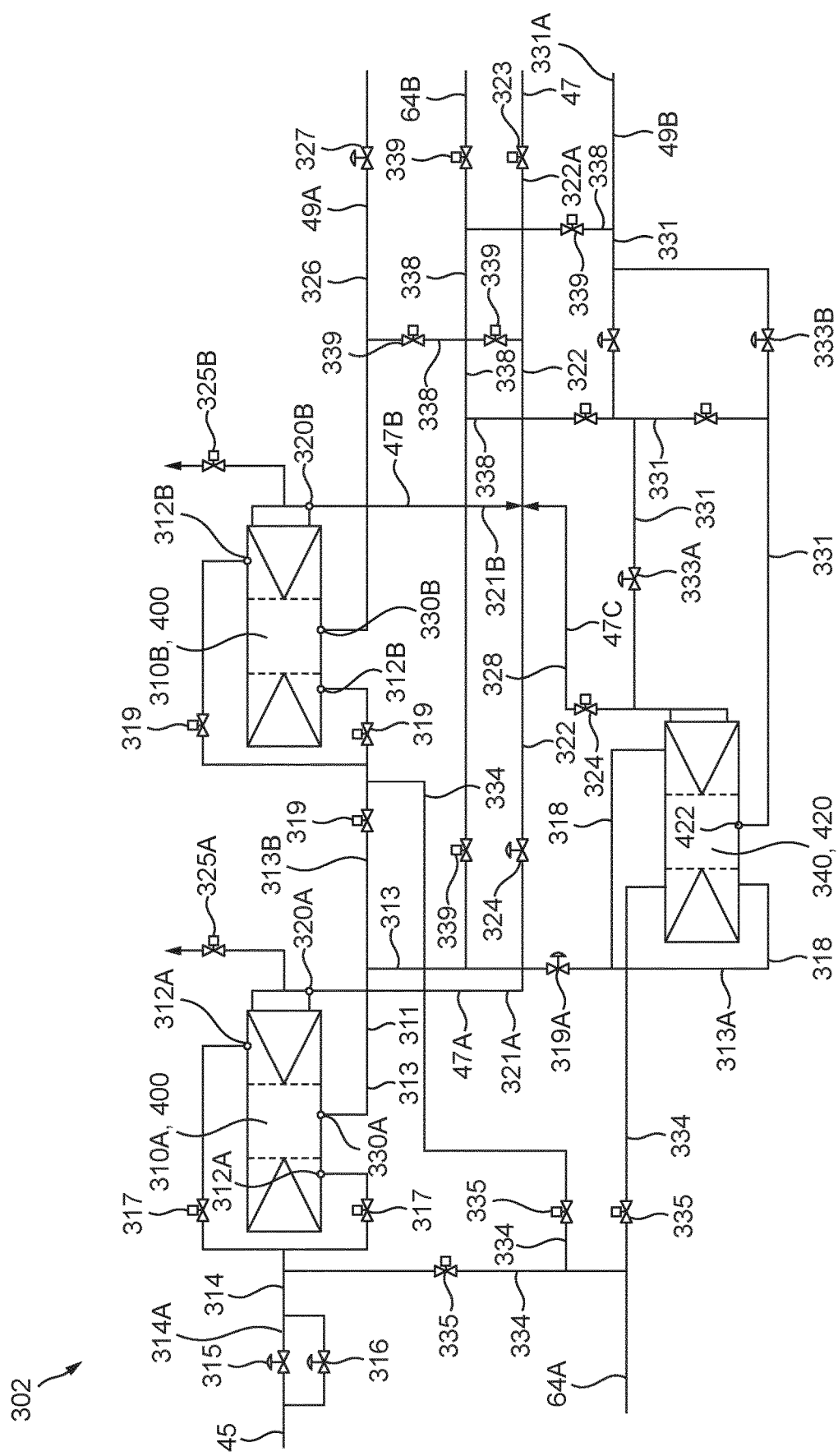
FIG. 14 is a schematic view of an embodiment of a membrane array of the membrane block of FIG. 13 in accordance with the principles disclosed herein.
Figure 15:
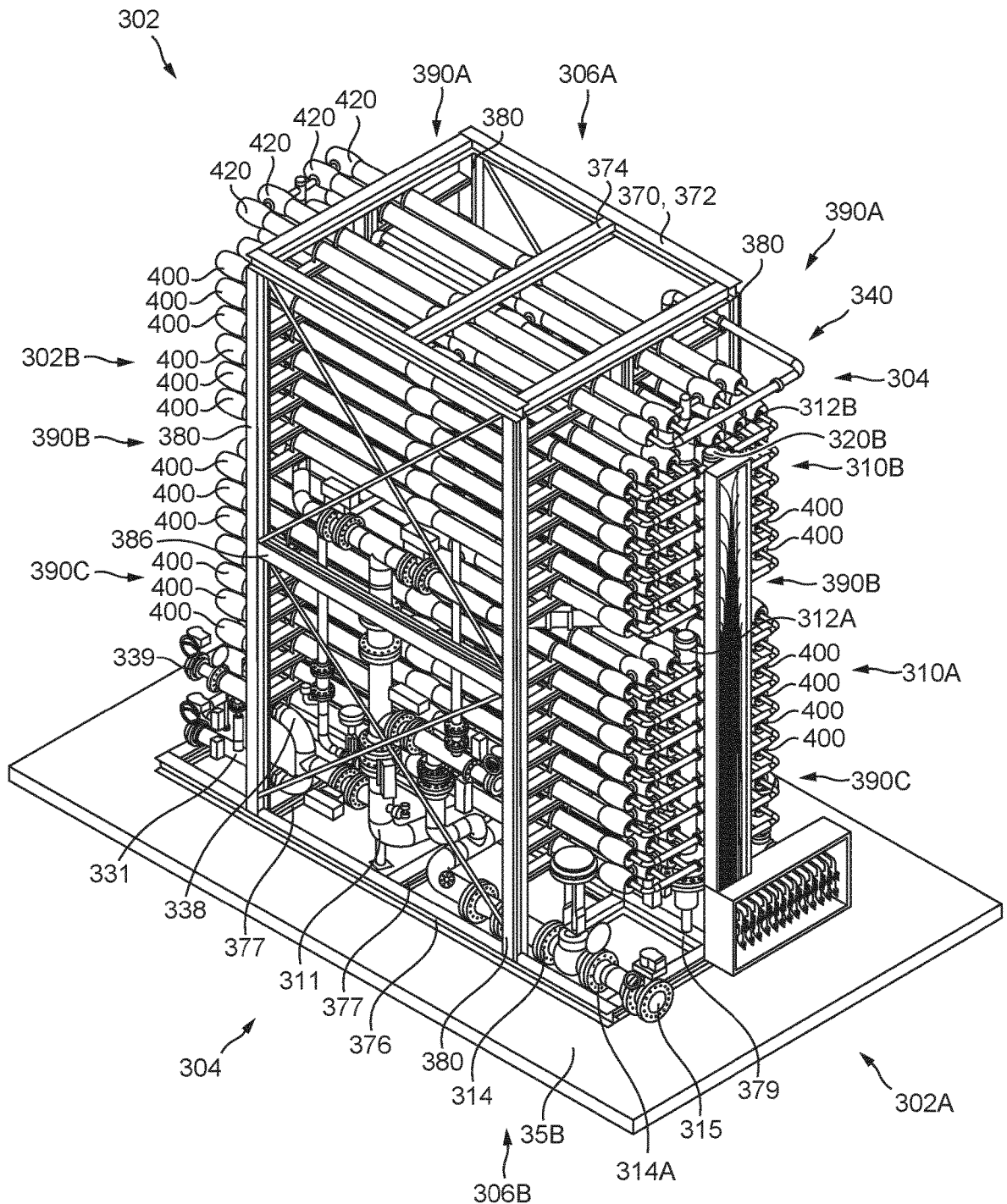
FIGS. 15-22 are perspective views of the membrane array of FIG. 14.
Figure 16:
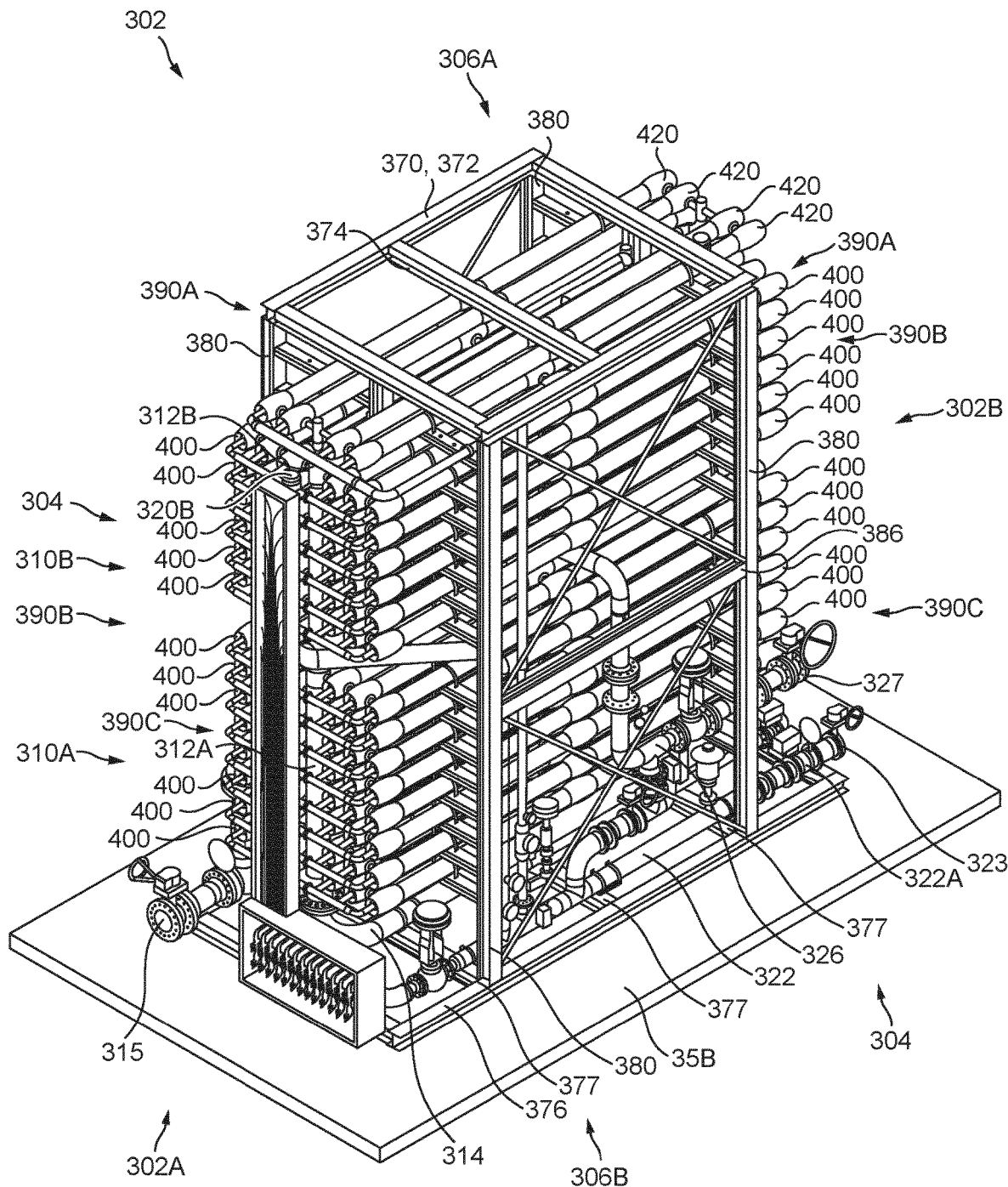
Figure 17:
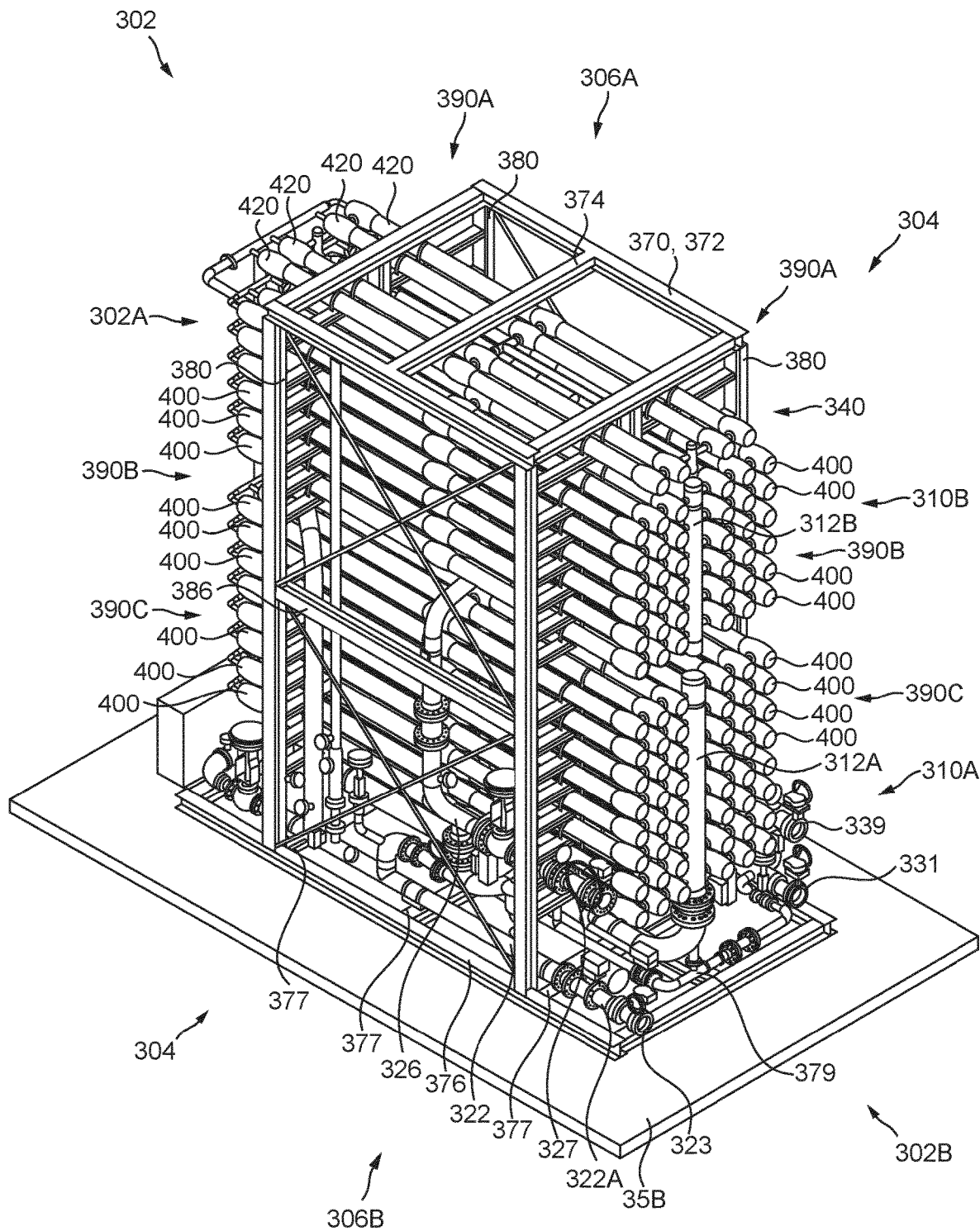
Figure 18:
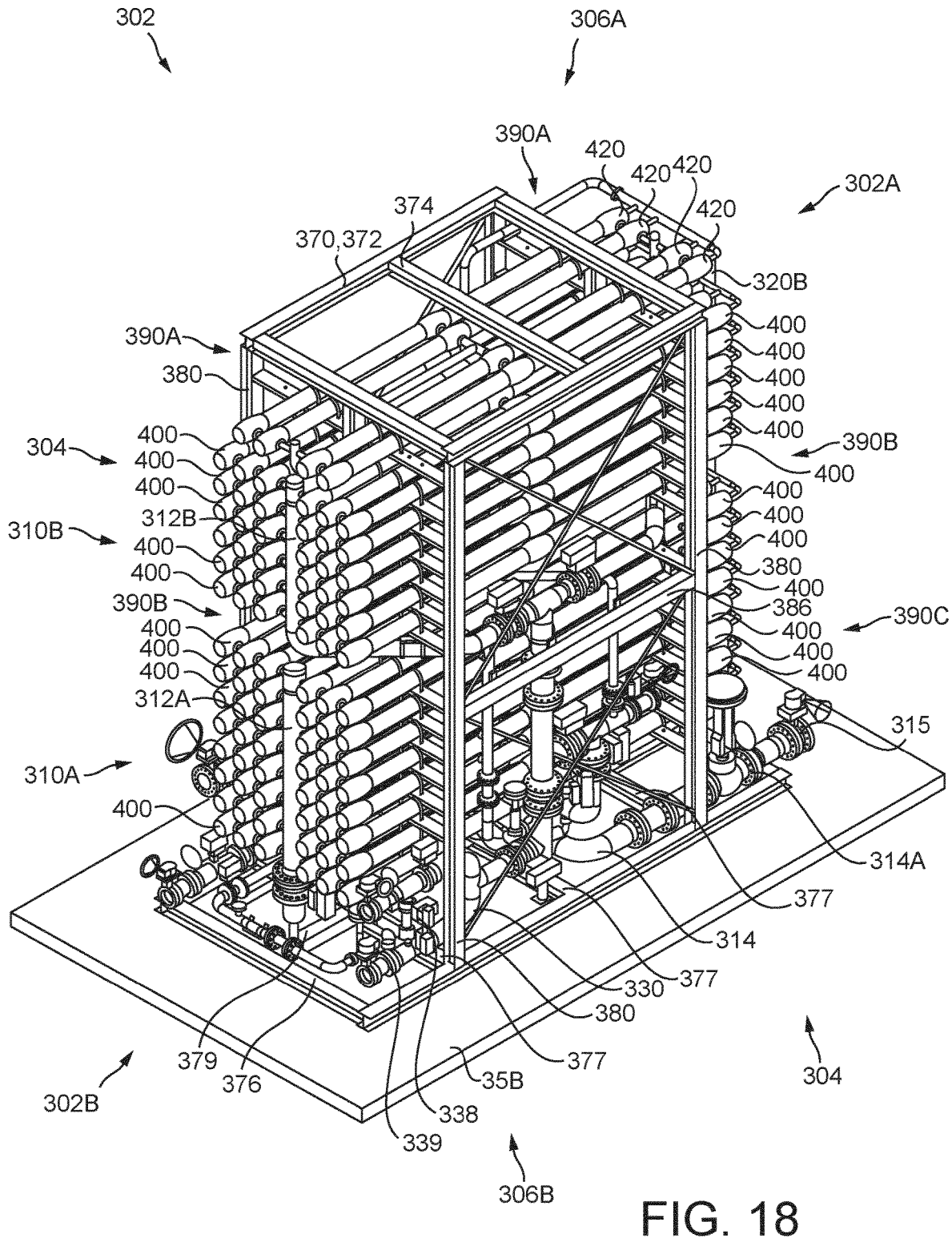
Figure 19:
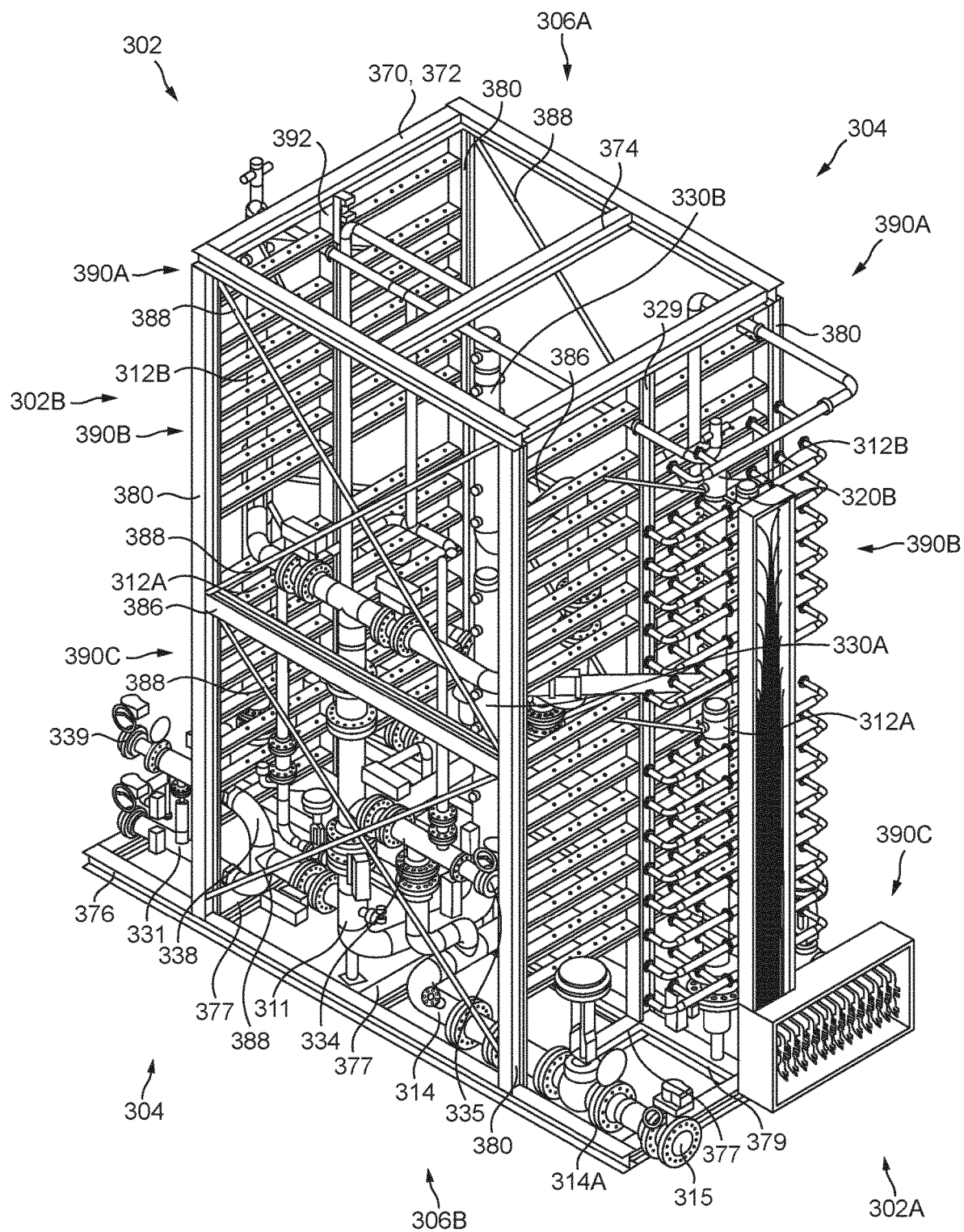
Figure 20:
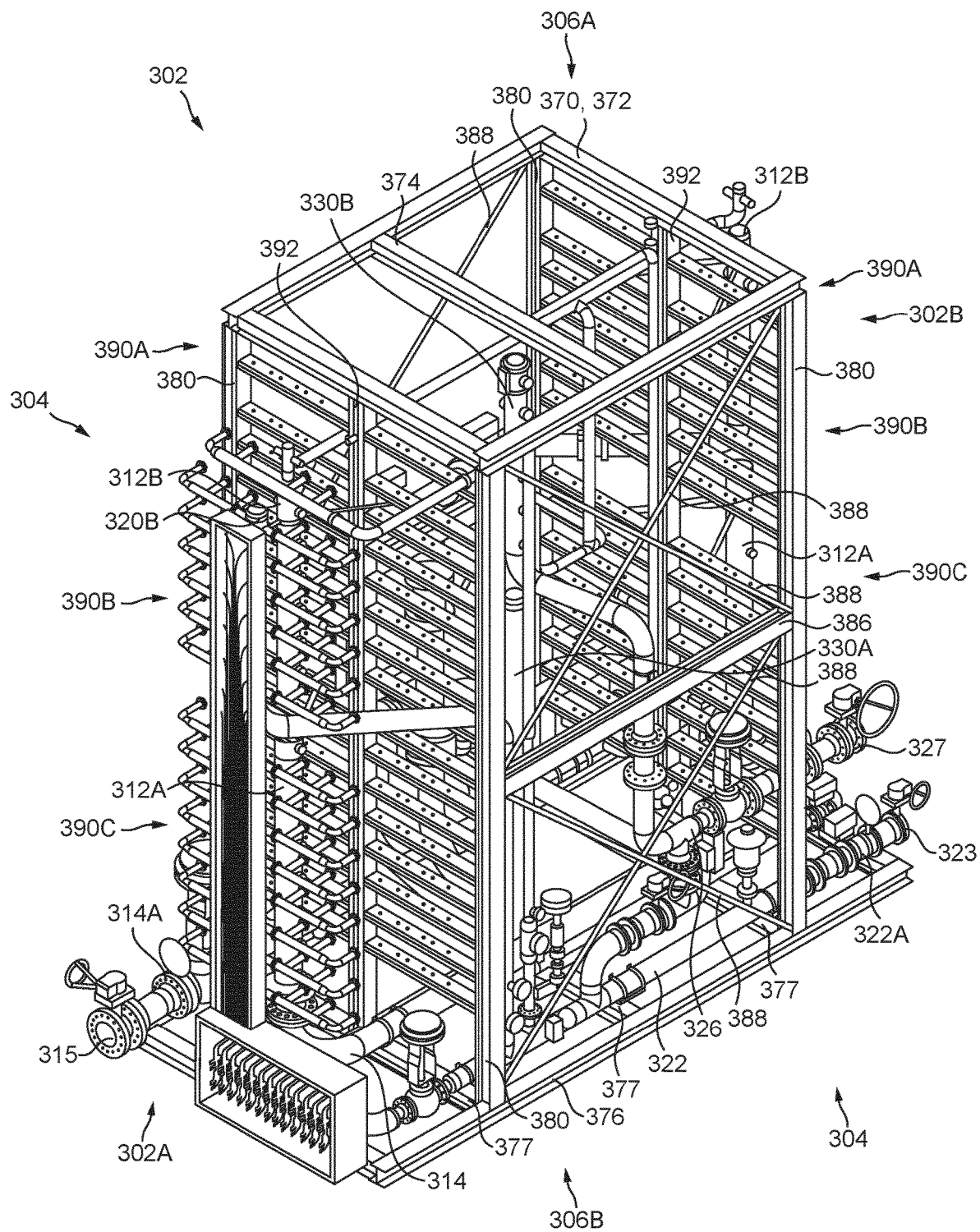
Figure 21:
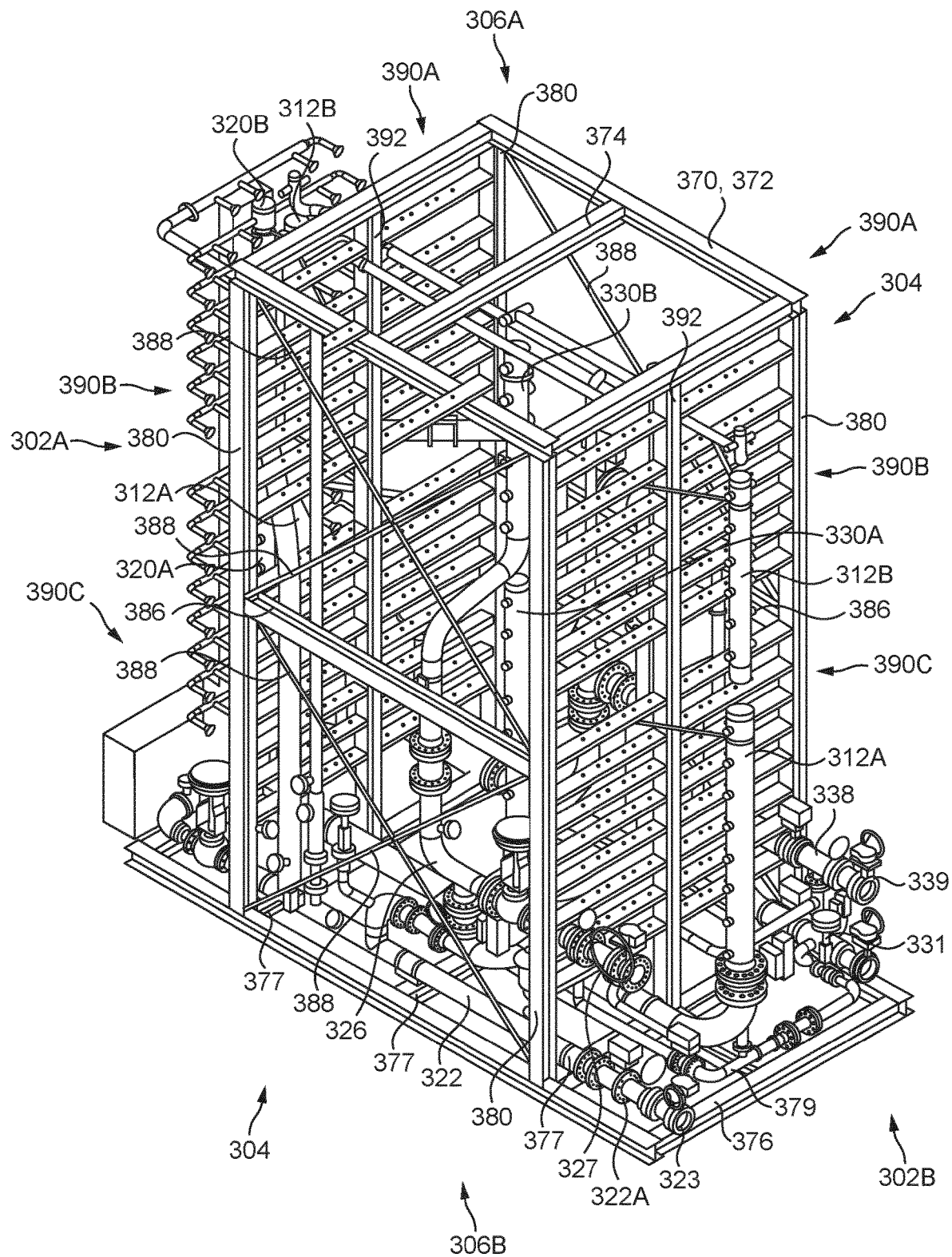
Figure 22:
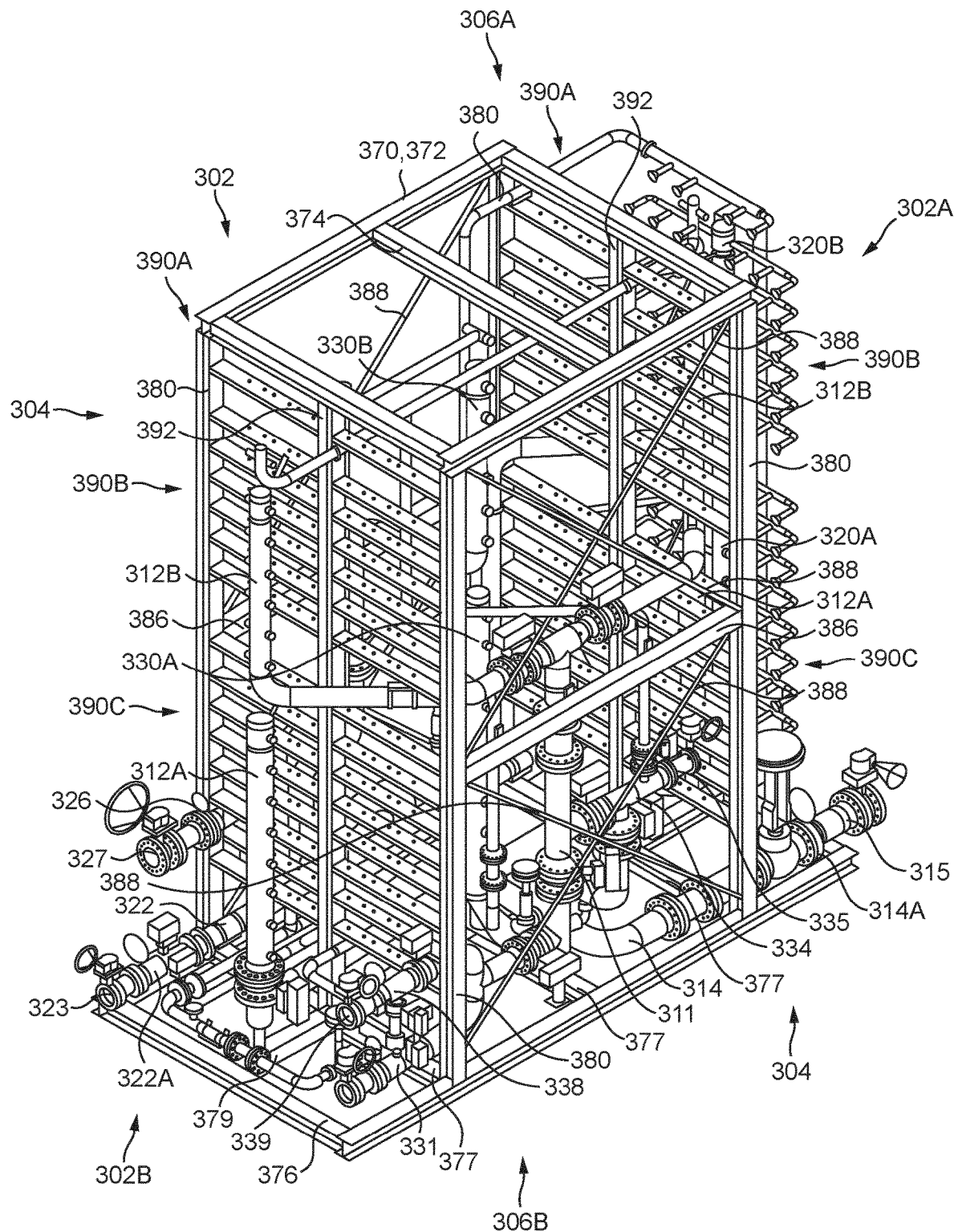

As shown particularly in FIG. 14, during operation of RO membrane skid 302, UF filtrate stream 45 flows into the RO membrane separation units 400 of the lower rack 310A of membrane skid 302 via lower inlet feed headers 312A and the outer radial ports of each RO membrane separation unit 400. The UF filtrate stream 45 then flows through the RO membrane elements disposed within each RO membrane separation unit 400 of lower rack 310A. The UF filtrate stream 45 is divided as it flows through RO membrane elements into a first RO permeate stream 47A and a first or initial RO reject or concentrate stream 313. The first RO permeate stream 47A exits each RO membrane separation unit 400 of lower rack 310A via the axial port of each RO membrane separation unit 400, where the RO permeate steam 47A flows into lower permeate discharge header 320A. The first RO concentrate stream 313 exits each RO membrane separation unit 400 of lower rack 310A via the central radial port of the filtration vessel of each RO membrane separation unit 400 and flows into the lower concentrate discharge header 330A.

The RO membrane separation units 400 of the upper rack 310B of membrane skid 302 are configured similarly as the RO membrane separation units 400 of lower rack 310A. However, instead of receiving UF filtrate stream 45 via the outer radial ports of each RO membrane separation unit 400, the outer radial ports of each membrane separation unit 400 of upper rack 310B receives a first portion 313A of the first RO concentrate stream 313 discharged by the RO membrane separation units 400 of lower rack 310A. The first portion 313A of the first RO concentrate stream 313 is divided as it flows through the RO membrane separation units 400 of upper rack 310B into a second RO permeate stream 47B and the RO concentrate stream 49A, where RO concentrate stream 49A comprises a second or final RO concentrate stream 49A. The second RO permeate stream 47B exits each RO membrane separation unit 400 of upper rack 310B via the axial port of each RO membrane separation unit 400, where the second RO permeate steam 47B flows into upper permeate discharge header 320B. The central radial port of each RO membrane separation unit 400 of upper rack 310B discharges the second RO concentrate stream 49A to dump tank 70. In some embodiments, the central radial port of each RO membrane separation unit 400 of upper rack 310B discharges the second RO concentrate stream 49A to an energy recovery device.

Each NF filtration unit 420 of membrane skid 302 comprises a cylindrical filtration vessel, a perforated tube disposed within the filtration vessel, and a plurality of NF filtration elements or membranes disposed radially between the perforated tube and the cylindrical vessel. The cylindrical vessel of each NF filtration unit 420 includes a pair of outer radial ports positioned proximal each end of the cylindrical vessel, where each outer radial port is in fluid communication with the lower concentrate discharge header 330A. The cylindrical vessel also includes a central radial port 422 (shown schematically in FIG. 14) positioned equidistantly between the outer radial ports. The perforated tube of each NF filtration unit 420 includes an axial port at an end of the cylindrical vessel positioned proximal to the second end 302B of membrane skid 302, where the axial port is in fluid communication with the combined RO permeate discharge from headers 320A, 320B via RO permeate pipeworks 321A, 321B, respectively, extending therefrom. In this embodiment, each NF filtration unit 420 houses two sets of three NF filtration elements; however, in other embodiments, the number of NF filtration elements of each NF filtration unit 420 may vary.

As shown particularly in FIG. 14, during operation of membrane skid 302, a first portion 313A of the first RO concentrate stream 313 flows into the NF filtration units 420 as a reduced pressure NF feed stream 318 via the outer radial ports of the filtration vessel of each NF filtration unit 420. The NF feed stream 318 flows through the NF filtration elements disposed within the NF filtration unit 420. The NF feed stream 318 is divided as it flows through NF filtration elements into an NF permeate stream 47C and the NF reject concentrate stream 49B (membrane reject stream 49 of FIG. 2 comprising the downstream combination of second RO concentrate stream 49A and NF concentrate stream 49B). The NF permeate stream 47C exits each NF filtration unit 420 via the axial port of each NF filtration unit 420. The NF concentrate stream 49B exits each NF filtration unit 420 via the central radial port 422 of the filtration vessel of each NF filtration unit 420.

As shown particularly in FIGS. 14 and 19-22, membrane skid 302 includes an inlet feed pipework 314 carrying UF filtrate stream 45, a first RO concentrate pipework 311 extending from lower concentrate discharge header 330A and carrying first RO concentrate stream 313, lower RO permeate pipework 321A extending from lower permeate discharge header 320A, upper RO permeate pipework 321B extending from upper permeate discharge header 320B, combined permeate pipework 322 that is coupled to RO permeate pipeworks 321A, 321B and an NF permeate pipework 328 extending from NF filtration units 420, a second RO concentrate pipework 326, an NF concentrate pipework 331, a CIP inlet pipework 334, and a CIP discharge pipework 338. In this embodiment, UF filtrate stream 45 flows through inlet feed pipework 314 of membrane skid 302, where inlet feed pipework 314 is coupled to the lower inlet feed headers 312A, inlet feed pipework 314 extending from a terminal or inlet end 314A that is coupled to an inlet feed valve 315 for controlling the inlet of UF filtrate stream 45 to lower inlet feed headers 312A and the RO membrane separation units 400 of lower rack 310A.

In this embodiment, membrane skid 302 also includes a low flow bypass valve 316 coupled to inlet feed pipework 314 for bypassing inlet feed valve 315 to provide for the flushing of membrane skid 302 during start up. Additionally, a plurality of feed valves 317 is disposed along inlet feed pipework 314 for controlling fluid flow therethrough. First RO concentrate stream 313 flows through the first RO concentrate pipework 311 of membrane skid 302. First RO concentrate pipework 311 extends between lower concentrate discharge header 330A and the upper inlet feed headers 312B. First RO concentrate pipework 311 also extends between lower concentrate discharge header 330A and the outer radial ports of each NF filtration unit 420. A plurality of RO concentrate valves 319 are disposed along first RO concentrate pipework 311 for controlling fluid flow therethrough. Particularly, one of the RO concentrate valves 319 (shown as RO concentrate valve 319A in FIG. 14) controls the flow rate and pressure of the NF feed stream 318 flowing to the NF filtration units 420.

The combined permeate pipework 322 of membrane skid 302 connects with the RO permeate pipeworks 321A, 321B, and the NF permeate pipework 328, and extends to a terminal or discharge end 322A that is coupled to a permeate discharge valve 323 for isolating the combined permeate stream 47. In this embodiment, the combined permeate stream 47 comprises a blend of the upper RO permeate stream 47A discharged from lower rack 310A, the NF permeate stream 47C discharged from rack 340, and a lower RO permeate stream 47C discharged from upper rack 310B.

Additionally, membrane permeate pipework 322 extends from the axial port of each NF filtration unit 420 to discharge end 322A. Further, a plurality of permeate valves 324 are disposed along membrane permeate pipework 322 for controlling fluid flow therethrough. In this configuration, RO permeate streams 47A, 47B, and at least a portion of the NF permeate stream 47C each flow through, and are mixed or blended in, permeate pipework 322 prior to being discharged from membrane skid 302 at the permeate discharge valve 323. Particularly, an NF permeate control valve 333A is disposed along NF concentrate pipework 331 for controlling the proportion of the NF permeate stream 47C supplied to permeate pipework 322. In this embodiment, lower RO permeate pipework 321A is connected to a lower vent valve 325A and upper permeate pipework 321B is connected to an upper vent valve 325B for venting the RO permeate streams 47A and 47B, respectively. Lower vent valve 325A and upper vent valve 325B may be operated to remove air and prevent over pressurization or vacuum in the racks 310A, 310B of RO membrane separation units 400 during startup and shutdown of membrane skid 302. Additionally, the permeate valve 324 disposed along lower RO permeate pipework 321A may be operated to regulate the flow of first RO permeate stream 47A and second RO permeate stream 47B by placing backpressure on lower rack 310A of RO membrane separation units 400, where an increase in backpressure on lower rack 310A increases production from upper rack 310B. In this manner, over-fluxing of lower rack 310A may be avoided and beneficial turbulent flow through upper rack 310B may be maintained, potentially optimizing long term production reliability.

The second RO concentrate pipework 326 of membrane skid 302 extends from upper concentrate discharge header 330B to a RO concentrate discharge valve 327 for controlling the discharge of RO concentrate stream 49A from the membrane skid 302. In some embodiments, second RO concentrate pipework 326 discharges RO concentrate stream 49A to an energy recovery device. The NF concentrate pipework 331 of membrane skid 302 extends from the central radial ports of NF filtration units 420 to a terminal or discharge end 331A. Additionally, NF concentrate pipework 331 is connected to the NF permeate pipework 328 to allow for the controlled dumping of excess NF permeate stream 47C via NF permeate control valve 333A. Additionally, an NF concentrate valve 333B is disposed along NF concentrate pipework 331 for controlling the flow of NF concentrate through NF concentrate pipework 331.

The CIP inlet pipework 334 of membrane skid 302 connects with inlet feed pipework 314, first RO concentrate pipework 311, and NF filtration units 420. CIP inlet pipework 334 includes a plurality of CIP inlet valves 335 for controlling the flow of fluid of CIP inlet stream 64A from CIP assembly 60 to inlet feed pipework 314, first RO concentrate pipework 311, and the NF filtration units 420. CIP discharge pipework 338 of membrane skid 302 connects with first RO concentrate pipework 311, second RO concentrate pipework 326, and NF concentrate pipework 331. CIP discharge pipework 338 includes a plurality of CIP discharge valves 339 the flow of CIP return stream 64B from first RO concentrate pipework 311, second RO concentrate pipework 326, and NF concentrate pipework 331 to CIP assembly 60. In some embodiments, the valves 315, 316, 317, 319, 323, 324, 327, 333A, 33B, 335, and 339 of membrane skid 302 are controlled remotely by the control system 15 of integrated system 10.

As shown particularly in FIGS. 19-22, in this embodiment, support structure 370 of membrane skid 302 generally includes a rectangular upper frame 372 positioned at the top 306A of membrane skid 302, a rectangular lower frame 376 positioned at the base 306B of membrane skid 302, a plurality of vertical support members 380, a first or upper support rack 390A, a plurality of second or intermediate support racks 390B, and a plurality of third or lower support racks 390C. Upper frame 372 include a laterally extending central support member 374 disposed equidistantly between the front and rear ends 302A, 302B of membrane skid 302. Lower frame 376 also includes a plurality of laterally extending support members 377 spaced between the ends 302A, 302B of membrane skid 302. Lower frame 376 further includes a longitudinally extending support member 379 disposed equidistantly between lateral sides 304 and extending between the ends 302A, 302B of membrane skid 302.

In this embodiment, support structure 370 includes four vertical support members 380, two vertical support members 380 disposed along each of the lateral sides 304 of membrane skid 302. Additionally, a first pair of vertical support members 380 is positioned proximal to the first end 302A of membrane skid 302, while a second pair of vertical support members 380 is positioned proximal to the second end 302B of membrane skid 302. Intermediate support racks 390B are disposed vertically between upper support rack 390A and lower support racks 390C, where upper support rack 390A is positioned proximal to upper frame 372 and a lowermost of the lower support racks 390C is positioned proximal to the lower frame 376 of support structure 370. In this embodiment, support structure 370 includes a pair of elevated horizontal support members 386, each elevated horizontal support member 386 extending between ends 302A, 302B and coupled to a pair of vertical support members 380. A plurality of cross-braces 388 extend diagonally between both upper frame 372 and elevated horizontal support members 386, and between elevated horizontal support members 386 and lower frame 376.

Support structure 370 additionally includes a pair of vertical support 392 positioned proximal to, but spaced from the ends 302A, 302B of membrane skid 302, each vertical support 392 positioned equidistantly between the lateral sides 304 of membrane skid 302. Each vertical support 392 extends vertically between the upper frame 372 and the lower frame 376 of support structure 370, where each support rack 390A, 390B, and 390C extends laterally between one of the lateral sides 304 of membrane skid 302 and one of the vertical supports 392. In this embodiment, support frames 372, 376, and members 374, 377, 378, 380, and 392 each comprise metallic (e.g., carbon steel, alloy steel, etc.) I-beams; however, in other embodiments, support frames 372, 376, and members 374, 377, 378, 380, and 392 may comprise varying cross-sectional shapes and materials.

In the configuration of membrane skid 302 described above, headers 312A, 312B, 320A, 320B, 330A and 300B, and pipeworks 314, 318, 322, 326, 331, and 334 are each directly supported by the lower frame 376 of support structure 370.

Particularly, only the racks 310A, 310B, and 340 of RO membrane separation units 400 and NF filtration units 420, respectively, are directly supported by a support member of support structure 370 that is elevated from the lower frame 376. Particularly, NF filtration units 420 contact, and are supported by upper support rack 390A; the upper rack 310B of RO membrane separation units 400 contact, and are supported by intermediate support racks 390B; and the lower rack 310A of RO membrane separation units 400 contact, and are supported by lower support racks 390C. Thus, the upper frame 372 of support structure 370 is not required to support the weight of headers 312A, 312B, 320A, 320B, 330A and 300B, and pipeworks 314, 318, 322, 326, 331, and 334 of membrane skid 302. By supporting the components of membrane skid 302 at the lower frame 376 thereof rather than at the upper frame 372, the total weight of support structure 370 may be minimized given that the loads supported by upper frame 372 and vertical support members 380 may, in-turn, be minimized.

Additionally, valves 315, 316, 317, 319, 323, 324, 327, 333A, 333B, 335, and 339 of membrane skid 302 are each positioned proximal to lower frame 376 and distal to upper frame 372 of support structure 370. In other words, valves 315, 316, 317, 319, 323, 324, 327, 333A, 333B, 335, and 339 are positioned nearer to the lower frame 376 than to the upper frame 372 of support structure 370. With valves 315, 316, 317, 319, 323, 324, 327, 333A, 333B, 335, and 339 of membrane skid 302 positioned proximal lower frame 376, the distance between the deck 35B and a center of mass of the membrane skid 302 is minimized, thereby reducing the vertical distance $D_p$ between the sea floor 6 and the center of mass 33M of the desalination platform 32. With one or more embodiments, because the loads supported by upper frame 372 and vertical support members 380 are minimized, upper frame 372 and vertical support members 380 can be formed using lighter-weight materials. With one or more embodiments, the center of mass of membrane skid 302 is in the lower half of membrane skid 302. Further, given that valves 315, 316, 317, 319, 323, 324, 327, 333A, 333B, 335, and 339 of membrane skid 302 are positioned proximal to lower frame 376, the fluid conduits used to convey UF filtrate stream 45, RO reject stream 49A (comprising second RO concentrate stream 49A and NF reject stream 49B), and CIP streams 64A, 64B may each be supported by, and positioned proximal to, deck 35B (rather than being suspended from above in a position distal to deck 35B), further reducing the vertical distance $D_p$ between the sea floor 6 and the center of mass 33M of the desalination platform 32.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A desalination system, comprising:
a desalination platform;
a first skid disposed on a first deck of the desalination platform, the first skid comprising at least one of a first filtration unit configured to produce a first filtrate stream, and a first permeate unit configured to produce a first permeate stream;
a first interconnecting pipework coupled to the first skid;
a first pipework support disposed on the first deck, wherein the first interconnecting pipework is disposed on the first pipework support;
a support structure comprising an upper frame positioned at a too of the first skid and a lower frame positioned at a base of the first skid;
an inlet pipework coupled between an inlet valve and the at least one of the first filtration unit and the first permeate unit, wherein the at least one of the first filtration unit and the first permeate unit is supported by the support structure, wherein the at least one of the first filtration unit and the first permeate unit is configured to produce the first filtrate stream or the first permeate stream, respectively from an inlet stream supplied to the inlet valve; and
a discharge pipework coupled between the at least one of the first filtration unit and the first permeate unit and a discharge valve; and
wherein the inlet valve and the discharge valve are each directly supported by the lower frame of the support structure.

2. The desalination system of claim 1, wherein:
the first skid comprises a membrane skid and the first permeate unit comprises a reverse osmosis (RO) membrane separation unit; and
the first permeate stream comprises a RO permeate stream.

3. The desalination system of claim 1, wherein:
the first skid comprises an ultrafiltration (UF) skid and the first filtration unit comprises an UF filtration unit; and
the first filtrate stream comprises an UF filtrate stream.

4. The desalination system of claim 1, wherein the interconnecting pipework is configured receive at least one of the first filtrate stream and the first permeate stream from the first skid.

5. The desalination system of claim 1, wherein the first skid comprises:
the first filtration unit, and wherein
the inlet pipework is coupled between the inlet valve and the first filtration unit supported by the support structure, wherein the first filtration unit is configured to produce the first filtrate stream from the inlet stream supplied to the inlet valve; and
the discharge pipework is coupled between the first filtration unit and a discharge valve.

6. The desalination system of claim 5, further comprising:
an inlet header extending vertically between the upper frame and the lower frame of the support structure;
a plurality of the first filtration units, wherein each of the plurality of first filtration units is in fluid communication with the inlet header;
wherein the inlet pipework is coupled between the inlet valve and the inlet header;
wherein the inlet header is directly supported by the lower frame of the support structure.

7. The desalination system of claim 1, wherein the interconnecting pipework is coupled between the first skid and a second skid, wherein the second skid is disposed on a second deck of the desalination platform, and wherein the second skid comprises a first membrane separation unit configured to produce a first permeate stream.

8. An integrated system, comprising:
a desalination system, comprising:
a desalination platform;
a first skid disposed on a first deck of the desalination platform, the first skid comprising a first filtration unit configured to produce a first filtrate stream;
a second skid disposed on the desalination platform, the second skid comprising a first membrane separation unit configured to receive the first filtrate stream from the first skid and produce a first permeate stream;
a first interconnecting pipework coupled between the first skid and the second skid;
a first pipework support disposed on the first deck, wherein the first interconnecting pipework is disposed on the first pipework support;
a support structure comprising an upper frame positioned at a too of the first skid and a lower frame positioned at a base of the first skid,
an inlet pipework coupled between an inlet valve and the at least one of the first filtration unit and the first permeate unit, wherein the at least one of the first filtration unit and the first permeate unit is supported by the support structure, wherein the at least one of the first filtration unit and the first permeate unit is configured to produce the first filtrate stream or the first permeate stream, respectively, from an inlet stream supplied to the inlet valve; and
a discharge pipework coupled between the at least one of the first filtration unit and the first permeate unit and a discharge valve;
wherein the inlet valve and the discharge valve are each directly supported by the lower frame of the support structure:
an injection system for one or more injection wells that penetrate an oil-bearing layer of a reservoir;
a blending system; and
a production system to separate fluids produced from one or more production wells that penetrate the oil-bearing layer of the reservoir and to deliver a produced water (PW) stream to the blending system;
wherein the blending system is to blend the first permeate stream with the PW stream to produce a blended low salinity water stream for injection into the reservoir.

9. The integrated system of claim 8, further comprising a control system configured to control the blending of the first permeate stream with the PW stream.

10. The integrated system of claim 8, wherein:
the first skid comprises an ultrafiltration (UF) skid and the first filtration unit comprises an UF filtration unit; and
the first filtrate stream comprises an UF filtrate stream.

11. The integrated system of claim 8, wherein:
the second skid comprises a membrane skid and the first membrane separation unit comprises a reverse osmosis (RO) membrane separation unit; and
the first permeate stream comprises a RO permeate stream.

12. The integrated system of claim 8, wherein:
an inlet pipework is coupled between the inlet valve and the first membrane separation unit supported by the support structure, wherein the first membrane separation unit is configured to produce the first permeate stream from an inlet stream supplied to the inlet valve; and the second skid comprises a permeate pipework coupled between the first membrane separation unit and a permeate valve; and the inlet valve and the permeate valve are each directly supported by the lower frame of the support structure.

13. The integrated system of claim 12, wherein the inlet valve and the permeate valve are each positioned nearer to the lower frame than to the upper frame of the support structure.

14. The integrated system of claim 12, wherein the second skid further comprises a discharge pipework connected between the first membrane separation unit and a second membrane separation unit supported by the support structure, wherein the discharge pipework is configured to provide a discharge stream from the first membrane separation unit to the second membrane separation unit.

15. A skid for providing a permeate stream, comprising:
a support structure comprising an upper frame positioned at a top of the skid, a lower frame positioned at a base of the skid, and a plurality of vertically extending members coupled between the upper frame and the lower frame;

an inlet pipework coupled between an inlet valve and a first membrane separation unit supported by the support structure, wherein the first membrane separation unit is configured to produce a first permeate stream from an inlet stream supplied to the inlet valve; and a permeate pipework coupled between the first membrane separation unit and a permeate valve; and wherein the inlet valve and the permeate valve are each directly supported by the lower frame of the support structure.

16. The skid of claim 15, wherein the first membrane separation unit comprises a reverse osmosis (RO) membrane separation unit.

17. The skid of claim 15, further comprising:
an inlet header extending vertically between the upper frame and the lower frame of the support structure;

a plurality of the first membrane separation units, wherein each of the plurality of first membrane separation units is in fluid communication with the inlet header;

wherein the inlet pipework is coupled between the inlet valve and the inlet header;

wherein the inlet header is directly supported by the lower frame of the support structure.

18. The skid of claim 17, wherein the plurality of first membrane separation units are supported by a plurality of support racks spaced between the upper frame and the lower frame of the support structure.

19. The skid of claim 17, further comprising:
a discharge header extending vertically between the upper frame and the lower frame of the support structure, wherein the discharge header is in fluid communication with the plurality of first membrane separation units;

a permeate discharge pipework connected between the permeate discharge header and a plurality of second membrane separation units supported by the support structure, wherein the discharge pipework is configured to provide a discharge stream from the plurality of first membrane separation units to the plurality of second membrane separation units.

20. The skid of claim 15, wherein the inlet valve and the permeate valve are each positioned nearer to the lower frame than to the upper frame of the support structure.

* * * * *